(12) United States Patent
Poirier

(10) Patent No.: US 12,363,440 B2
(45) Date of Patent: Jul. 15, 2025

(54) SITUATIONAL AWARENESS-BASED IMAGE ANNOTATION SYSTEMS AND METHODS

(71) Applicant: Teledyne FLIR Defense, Inc., Thousand Oaks, CA (US)

(72) Inventor: Bruce Poirier, North Billerica, MA (US)

(73) Assignee: Teledyne FLIR Defense, Inc., Thousand Oaks, CA (US)

( * ) Notice: Subject to any disclaimer, the term of this patent is extended or adjusted under 35 U.S.C. 154(b) by 0 days.

(21) Appl. No.: 17/514,516

(22) Filed: Oct. 29, 2021

(65) Prior Publication Data

US 2022/0141384 A1    May 5, 2022

Related U.S. Application Data

(60) Provisional application No. 63/108,240, filed on Oct. 30, 2020.

(51) Int. Cl.
*H04N 23/698*    (2023.01)
*B60R 1/27*    (2022.01)
(Continued)

(52) U.S. Cl.
CPC .......... *H04N 23/698* (2023.01); *B60R 1/27* (2022.01); *G01S 13/867* (2013.01);
(Continued)

(58) Field of Classification Search
CPC ...... H04N 23/698; H04N 23/90; H04N 23/11; G06T 7/70; G06T 2207/10016;
(Continued)

(56) References Cited

U.S. PATENT DOCUMENTS

| 7,660,437 | B2 | 2/2010 | Breed |
| 7,823,058 | B2 * | 10/2010 | Pea ........................ H04N 5/262 |
| | | | 345/620 |

(Continued)

FOREIGN PATENT DOCUMENTS

| CN | 108564527 A | 9/2018 |
| WO | WO 2021/119366 A1 | 6/2021 |

OTHER PUBLICATIONS

Leonardo DRS, "Dve Wide Driver's Vision Enhancer Wide", Leonardo DVE Wide Datasheet, Jul. 2011, 2 Pages, Leonardo DRS, Melbourne, Florida, United States of America.
(Continued)

*Primary Examiner* — Christopher S Kelley
*Assistant Examiner* — Asmamaw G Tarko
(74) *Attorney, Agent, or Firm* — Haynes and Boone, LLP

(57) ABSTRACT

Techniques for facilitating situational awareness-based annotation systems and methods are provided. In one example, a method includes receiving a respective image from each of a plurality of imaging systems. The method further includes generating a panoramic image based on the images received from the plurality of imaging devices. The method further includes detecting an object in the panoramic image. The method further includes determining, for each image received from the plurality of imaging systems, whether the image contains the object detected in the panoramic image. The method further includes annotating each image received from the plurality of imaging systems determined to contain the object to include an indication associated with the object in the image. Related systems are also provided.

20 Claims, 12 Drawing Sheets

(51) Int. Cl.
  *G01S 13/86* (2006.01)
  *G01S 13/931* (2020.01)
  *G06T 7/70* (2017.01)
  *G06V 10/147* (2022.01)
  *G06V 20/56* (2022.01)
  *H04N 23/11* (2023.01)
  *H04N 23/90* (2023.01)

(52) U.S. Cl.
  CPC .............. *G01S 13/931* (2013.01); *G06T 7/70* (2017.01); *G06V 10/147* (2022.01); *G06V 20/56* (2022.01); *H04N 23/11* (2023.01); *H04N 23/90* (2023.01); *B60R 2300/20* (2013.01); *B60R 2300/30* (2013.01); *G06T 2207/10016* (2013.01); *G06T 2207/10048* (2013.01); *G06T 2207/20084* (2013.01); *G06T 2207/20212* (2013.01); *G06T 2207/30252* (2013.01)

(58) Field of Classification Search
  CPC . G06T 2207/10048; G06T 2207/20084; G06T 2207/20212; G06T 2207/30252; G06V 10/147; G06V 20/56; B60R 1/00; B60R 2300/20; B60R 2300/30; B60R 1/27; G01S 13/867; G01S 13/931
  USPC .......................................................... 348/36
  See application file for complete search history.

(56) References Cited

U.S. PATENT DOCUMENTS

| | | | | |
|---|---|---|---|---|
| 8,972,861 | B2* | 3/2015 | Pea | H04N 23/698 |
| | | | | 715/230 |
| 9,658,078 | B2 | 5/2017 | Backström et al. | |
| 9,807,319 | B2 | 10/2017 | Teich et al. | |
| 9,973,692 | B2* | 5/2018 | Szabo | H04N 23/57 |
| 10,447,966 | B2 | 10/2019 | Ritchey et al. | |
| 11,592,969 | B2* | 2/2023 | Li | G06T 19/00 |
| 2004/0125148 | A1* | 7/2004 | Pea | H04N 23/698 |
| | | | | 715/802 |
| 2005/0073585 | A1 | 4/2005 | Ettinger et al. | |
| 2006/0023090 | A1* | 2/2006 | Takata | H04N 5/2624 |
| | | | | 348/E5.053 |
| 2008/0266408 | A1* | 10/2008 | Kim | H04N 23/698 |
| | | | | 348/E5.024 |
| 2011/0096144 | A1* | 4/2011 | Pea | H04N 5/262 |
| | | | | 386/280 |
| 2012/0242783 | A1* | 9/2012 | Seo | G06T 3/0087 |
| | | | | 348/36 |
| 2015/0149960 | A1* | 5/2015 | Song | G06F 3/04845 |
| | | | | 715/810 |
| 2015/0172545 | A1* | 6/2015 | Szabo | H04N 7/181 |
| | | | | 348/36 |
| 2015/0358612 | A1* | 12/2015 | Sandrew | H04N 13/261 |
| | | | | 348/47 |
| 2015/0358613 | A1* | 12/2015 | Sandrew | H04N 13/243 |
| | | | | 348/47 |
| 2016/0105608 | A1* | 4/2016 | Pettegrew | H04N 23/51 |
| | | | | 348/37 |
| 2016/0105609 | A1* | 4/2016 | Pettegrew | G06T 3/4038 |
| | | | | 348/37 |
| 2016/0105649 | A1* | 4/2016 | Pettegrew | H04N 23/56 |
| | | | | 348/37 |
| 2016/0198088 | A1* | 7/2016 | Wang | B64C 39/024 |
| | | | | 348/36 |
| 2018/0288319 | A1* | 10/2018 | Veeramani | H04N 21/25825 |
| 2019/0020816 | A1* | 1/2019 | Shan | G06V 20/20 |
| 2019/0020817 | A1* | 1/2019 | Shan | H04N 23/698 |
| 2019/0035165 | A1 | 1/2019 | Gausebeck | |
| 2019/0132512 | A1* | 5/2019 | Jones | H04N 5/33 |
| 2019/0394441 | A1* | 12/2019 | Simek | H04N 23/45 |
| 2020/0021795 | A1* | 1/2020 | Zhou | H04N 13/183 |
| 2020/0195940 | A1* | 6/2020 | Noorkami | G06F 3/0304 |
| 2022/0043112 | A1* | 2/2022 | Stokes | G01S 7/417 |
| 2022/0114291 | A1* | 4/2022 | Li | G06T 19/00 |
| 2023/0092516 | A1* | 3/2023 | Taxbol | G06T 7/20 |

OTHER PUBLICATIONS

Elbit Systems Land, "IronVision 'See-Through' Head-Mounted Display technology for 360° situational awareness and advanced operation of Armored Fighting Vehicles", IronVision Information Sheet, Jan. 2016, Ver. 2, Elbit Systems Ltd., Haifa, Israel.

\* cited by examiner

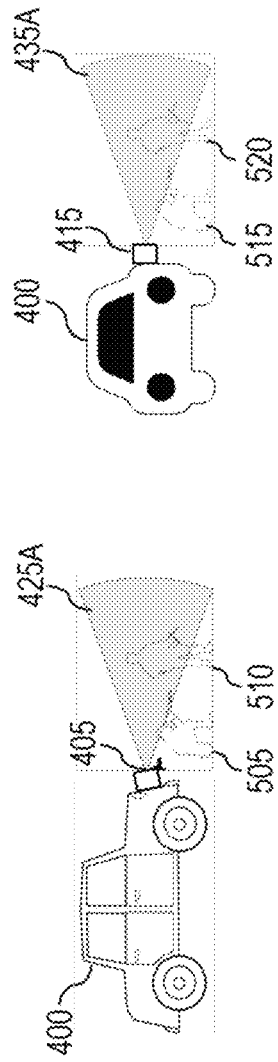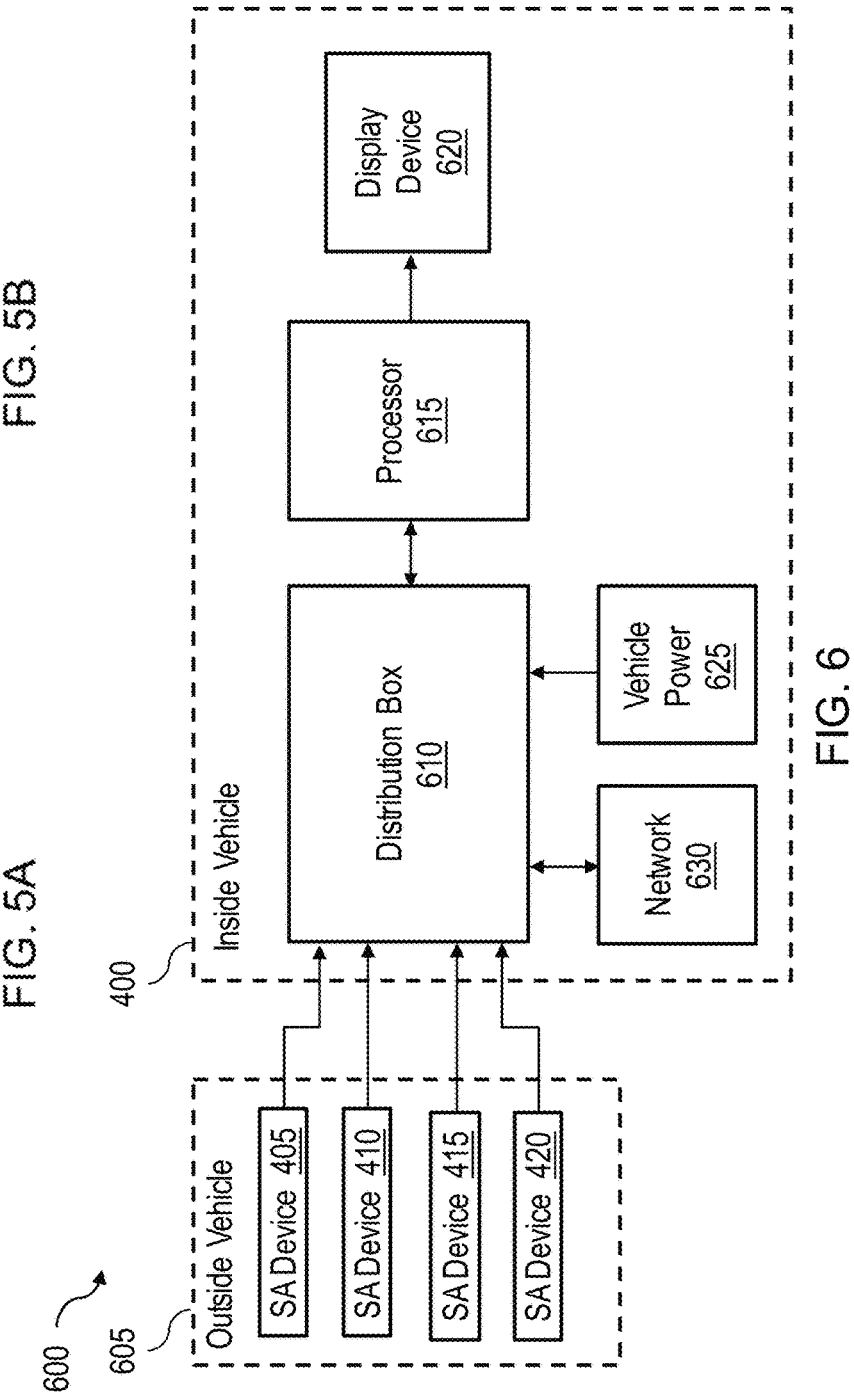

SITUATIONAL AWARENESS-BASED IMAGE ANNOTATION SYSTEMS AND METHODS

CROSS-REFERENCE TO RELATED APPLICATIONS

This application claims the benefit of and priority to U.S. Provisional Patent Application No. 63/108,240 filed Oct. 30, 2020 and entitled "SITUATIONAL AWARENESS-BASED IMAGE ANNOTATION SYSTEMS AND METHODS", which is incorporated herein by reference in its entirety.

TECHNICAL FIELD

One or more embodiments relate generally to imaging and more particularly, for example, to situational awareness-based annotation systems and methods.

BACKGROUND

Imaging systems may include an array of detectors, with each detector functioning as a pixel to produce a portion of a two-dimensional image. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

SUMMARY

In one or more embodiments, a method includes receiving a respective image from each of a plurality of imaging systems. The method further includes generating a panoramic image based on the images received from the plurality of imaging systems. The method further includes detecting an object in the panoramic image. The method further includes determining, for each image received from the plurality of imaging systems, whether the image contains the object detected in the panoramic image. The method further includes annotating each image received from the plurality of imaging systems determined to contain the object to include an indication associated with the object in the image.

In one or more embodiments, a system includes a plurality of imaging systems. Each of the plurality of imaging systems is configured to capture a respective image. The system further includes a processing circuit that includes a combiner circuit, a detection circuit, and an annotation circuit. The combiner circuit is configured to receive the images from the plurality of imaging systems and generate a panoramic image based on the images received from the plurality of imaging systems. The detection circuit is configured to detect an object in the panoramic image. The annotation circuit is configured to determine, for each image received from the plurality of imaging systems, whether the image contains the object detected in the panoramic image. The annotation circuit is further configured to annotate each image received from the plurality of imaging systems determined to contain the object to include an indication associated with the object in the image.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 5A and 5B illustrate examples of situational awareness associated with a vehicle in accordance with one or more embodiments of the present disclosure.

FIG. 6 illustrates an example system for providing situational awareness in accordance with one or more embodiments of the present disclosure.

Figure 1:
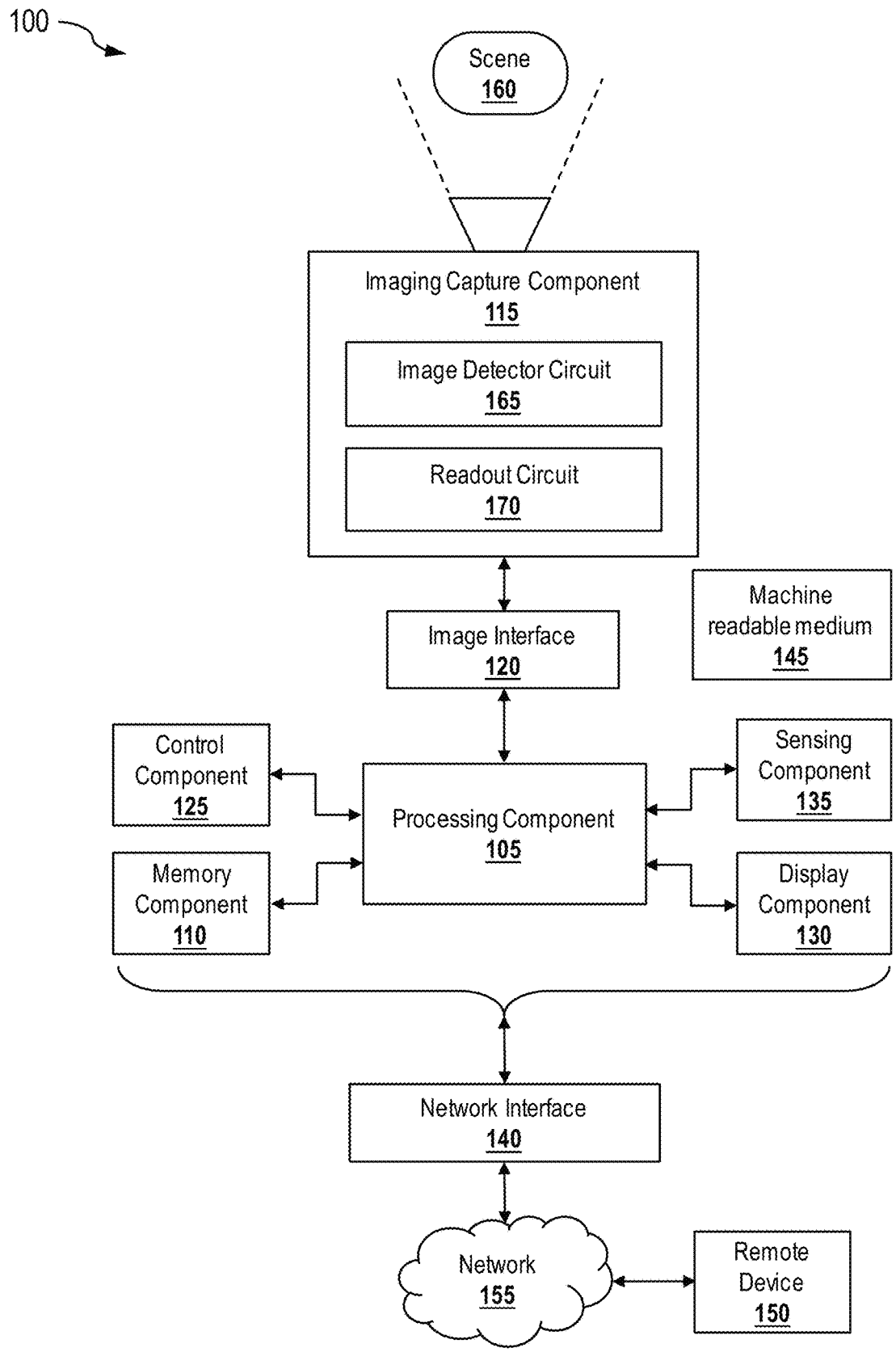
FIG. 1 illustrates a block diagram of an example imaging system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various embodiments of methods and systems disclosed herein may be used to facilitate situational awareness-based image annotation. In some embodiments, such situational awareness may be based on images (e.g., one or more sequences of images) of a scene captured using one or more imaging systems. A wide field of view (FOV) panoramic image may be generated using a set of images provided by one or more imaging systems, in which the wide FOV panoramic image has an FOV wider than an FOV of each image in the set of images. In some aspects, the set of images may include panoramic images having an FOV narrower than the FOV of the wide FOV panoramic image generated based on these panoramic images. In such aspects, each imaging system may include imaging devices. For a given imaging system, each imaging device of the imaging system may capture an image, and the imaging system may combine the images captured by its imaging devices to generate a panoramic image. The wide FOV panoramic image may provide up to a 360° FOV. In various embodiments, the imaging systems are distributed at different locations from each other while having overlapping FOVs.

In some embodiments, a detection process may be performed on the wide FOV panoramic image to detect for objects in the wide FOV panoramic image. In some aspects, the detection process may be based on convolutional neural networks (CNNs). The CNNs may be trained to detect objects (e.g., pre-established objects). For a given object detected in the wide FOV panoramic image, the detected object may be associated with one or more of the images used to generate the wide FOV panoramic image. These associated images are determined to contain the object detected in the wide FOV panoramic image. Annotations may be added to these associated images.

In an embodiment, performing a detection process on a single wide FOV panoramic image rather than performing a separate detection process on each image used to generate the wide FOV panoramic image may prevent detecting an object redundantly due to an overlap of FOVs of the images used to generate the wide FOV panoramic image. For example, if an object is present in two of the images used to generate the wide FOV panoramic image, performing a detection process on the wide FOV panoramic image may avoid erroneously identifying this object as being two distinct objects in the case a separate detection process is performed on the two images. Furthermore, a single instantiation of the detection process is generally associated with lower computational computing overhead compared to multiple instantiations of the detection process (e.g., one instantiation for each of the images used to generate the wide FOV panoramic image).

Using various embodiments, situational awareness is used to facilitate annotation of images. In some embodiments, the situational awareness is a 360° situational awareness. In some aspects, imaging systems may be attached (e.g., mounted) to a structure, integrated into the structure, and/or otherwise coupled/secured to the structure to provide situational awareness around the structure. In some aspects, the structure may be a mobile structure, such as a vehicle. For example, situational awareness may be provided to a vehicle to facilitate maneuverability of the vehicle by eliminating blind spots and detecting objects and/or threats. In some aspects, each imaging system coupled to the structure may have an FOV of at least 90°. In some cases, employing imaging systems having FOVs greater than 90° may help ease installation of the imaging systems on the structure as well as minimize any blind spots (e.g., blind spots close to the structure). The FOVs of the imaging systems may have some overlap from imaging system to imaging system.

Various embodiments of methods and systems disclosed herein may be included in or implemented as various devices and systems such as visible-light imaging systems, infrared imaging systems, imaging systems having visible-light and infrared imaging capability, video surveillance systems, video processing systems, or other systems or devices that may need to obtain image data in one or multiple portions of the EM spectrum.

Referring now to the drawings, FIG. 1 illustrates a block diagram of an example imaging system 100 (e.g., an infrared camera) in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images in accordance with an embodiment of the disclosure. The imaging system 100 may represent any type of imaging system that detects one or more ranges (e.g., wavebands) of EM radiation and provides representative data (e.g., one or more still image frames or video image frames). The imaging system 100 may include a housing that at least partially encloses components of the imaging system 100, such as to facilitate compactness and protection of the imaging system 100. In an embodiment, the imaging system 100 may include a portable device and may be incorporated, for example, into a vehicle or a non-mobile installation requiring images to be stored and/or displayed. The vehicle may be a land-based vehicle (e.g., automobile, truck), a naval-based vehicle, an aerial vehicle (e.g., unmanned aerial vehicle (UAV)), a space vehicle, or generally any type of vehicle that may incorporate (e.g., installed within, mounted thereon, etc.) the imaging system 100. In another example, the imaging system 100 may be coupled to various types of fixed locations (e.g., a home security mount, a campsite or outdoors mount, or other location) via one or more types of mounts. In an aspect, some of the components of the imaging system 100 may be attached/secured to a vehicle, some of the components of the imaging system 100 may be inside the vehicle, and/or some of the components of the imaging system 100 may be remote from the vehicle.

The imaging system 100 includes, according to one implementation, a processing component 105, a memory component 110, an image capture component 115, an image interface 120, a control component 125, a display component 130, a sensing component 135, and/or a network interface 140. The processing component 105, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. The processing component 105 may be configured to interface and communicate with the various other components (e.g., 110, 115, 120, 125, 130, 135, 140, etc.) of the imaging system 100 to perform such operations. For example, the processing component 105 may be configured to process captured image data received from the imaging capture component 115, store the image data in the memory component 110, and/or retrieve stored image data from the memory component 110. In one aspect, the processing component 105 may be configured to perform various system control operations (e.g., to control communications and operations of various components of the imaging system 100) and other image processing operations (e.g., data conversion, video analytics, etc.).

The memory component 110 includes, in one embodiment, one or more memory devices configured to store data and information, including infrared image data and information. The memory component 110 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processing component 105 may be configured to execute software instructions stored in the memory component 110 so as to perform method and process steps and/or operations. The processing component 105 and/or the image interface 120 may be configured to store in the memory component 110 images or digital image data captured by the imaging capture component 115. The processing component 105 may be configured to store processed still and/or video images in the memory component 110.

In some embodiments, a separate machine-readable medium 145 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 145 may be portable and/or located separate from the imaging system 100, with the stored software instructions and/or data provided to the imaging system 100 by coupling the machine-readable medium 145 to the imaging system 100 and/or by the imaging system 100 downloading (e.g., via a wired link and/or a wireless link) from the machine-readable medium 145. It should be appreciated that various modules may be integrated in software and/or hardware as part of the processing component 105, with code (e.g., software or configuration data) for the modules stored, for example, in the memory component 110.

The imaging system 100 may represent an imaging device, such as a video and/or still camera, to capture and process images and/or videos of a scene 160. In this regard, the image capture component 115 of the imaging system 100 may be configured to capture images (e.g., still and/or video images) of the scene 160 in a particular spectrum or modality. The image capture component 115 includes an image detector circuit 165 (e.g., a thermal infrared detector circuit) and a readout circuit 170 (e.g., an ROIC). In some cases, the image capture component 115 does not have a shutter, such that the image detector circuit 165 is exposed to a scene encompassed by a field of view of the image capture component 115. For example, the image capture component 115 may include an IR imaging sensor (e.g., IR imaging sensor array) configured to detect IR radiation in the near, middle, and/or far IR spectrum and provide IR images (e.g., IR image data or signal) representative of the IR radiation from the scene 160. For example, the image detector circuit 165 may capture (e.g., detect, sense) IR radiation with wavelengths in the range from around 700 nm to around 2 mm, or portion thereof. For example, in some aspects, the image detector circuit 165 may be sensitive to (e.g., better detect) short-wave IR (SWIR) radiation, mid-wave IR (MWIR) radiation (e.g., EM radiation with wavelength of 2 µm to 5 µm), and/or long-wave IR (LWIR) radiation (e.g., EM radiation with wavelength of 7 µm to 14 µm), or any desired IR wavelengths (e.g., generally in the 0.7 µm to 14 µm range). In other aspects, the image detector circuit 165 may capture radiation from one or more other wavebands of the EM spectrum, such as visible-light, ultraviolet light, and so forth.

The image detector circuit 165 may capture image data associated with the scene 160. To capture the image, the image detector circuit 165 may detect image data of the scene 160 (e.g., in the form of EM radiation) and generate pixel values of the image based on the scene 160. An image may be referred to as a frame or an image frame. In some cases, the image detector circuit 165 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting examples, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns.

The image may be, or may be considered, a data structure that includes pixels and is a representation of the image data associated with the scene 160, with each pixel having a pixel value that represents EM radiation emitted or reflected from a portion of the scene and received by a detector that generates the pixel value. Based on context, a pixel may refer to a detector of the image detector circuit 165 that generates an associated pixel value or a pixel (e.g., pixel location, pixel coordinate) of the image formed from the generated pixel values.

In an aspect, the pixel values generated by the image detector circuit 165 may be represented in terms of digital count values generated based on the electrical signals obtained from converting the detected radiation. For example, in a case that the image detector circuit 165 includes or is otherwise coupled to an analog-to-digital converter (ADC) circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 165 (e.g., an IR image detector circuit) is associated with higher digital count values and higher temperatures.

The readout circuit 170 may be utilized as an interface between the image detector circuit 165 that detects the image data and the processing component 105 that processes the detected image data as read out by the readout circuit 170, with communication of data from the readout circuit 170 to the processing component 105 facilitated by the image interface 120. An image capturing frame rate may refer to the rate (e.g., images per second) at which images are detected in a sequence by the image detector circuit 165 and provided to the processing component 105 by the readout circuit 170. The readout circuit 170 may read out the pixel values generated by the image detector circuit 165 in accordance with an integration time (e.g., also referred to as an integration period).

In various embodiments, a combination of the image detector circuit 165 and the readout circuit 170 may be, may include, or may together provide an FPA. In some aspects, the image detector circuit 165 may be a thermal image detector circuit that includes an array of microbolometers, and the combination of the image detector circuit 165 and the readout circuit 170 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometers may absorb incident IR radiation and produce a corresponding change in temperature in the microbolometers. The change in temperature is associated with a corresponding change in resistance of the microbolometers. With each microbolometer functioning as a pixel, a two-dimensional image or picture representation of the incident IR radiation can be generated by translating the changes in resistance of each microbolometer into a time-multiplexed electrical signal. The translation may be performed by the ROIC. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the imaging capture component 115 may include one or more filters adapted to pass radiation of some wavelengths but substantially block radiation of other wavelengths. For example, the imaging capture component 115 may be an IR imaging device that includes one or more filters adapted to pass IR radiation of some wavelengths while substantially blocking IR radiation of other wavelengths (e.g., MWIR filters, thermal IR filters, and narrow-band filters). In this example, such filters may be utilized to tailor the imaging capture component 115 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 115 may include an IR imaging sensor having an FPA of detectors responsive to IR radiation including near infrared (NIR), short-wave IR (SWIR), MWIR, long-wave IR (LWIR), and/or very-long wave IR (VLWIR) radiation. In some other embodiments, alternatively or in addition, the image capture component 115 may include a complementary metal oxide semiconductor (CMOS) sensor or a charge-coupled device (CCD) sensor that can be found in any consumer camera (e.g., visible light camera).

The images, or the digital image data corresponding to the images, provided by the image capture component 115 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The image interface 120 may include, in some embodiments, appropriate input ports, connectors, switches, and/or circuitry configured to interface with external devices (e.g., a remote device 150 and/or other devices) to receive images (e.g., digital image data) generated by or otherwise stored at the external devices. The received images or image data may be provided to the processing component 105. In this regard, the received images or image data may be converted into signals or data suitable for processing by the processing component 105. For example, in one embodiment, the image interface 120 may be configured to receive analog video data and convert it into suitable digital data to be provided to the processing component 105.

In some embodiments, the image interface 120 may include various standard video ports, which may be connected to a video player, a video camera, or other devices capable of generating standard video signals, and may convert the received video signals into digital video/image data suitable for processing by the processing component 105. In some embodiments, the image interface 120 may also be configured to interface with and receive images (e.g., image data) from the image capture component 115. In other embodiments, the image capture component 115 may interface directly with the processing component 105.

The control component 125 includes, in one embodiment, a user input and/or an interface device, such as a rotatable knob (e.g., potentiometer), push buttons, slide bar, keyboard, and/or other devices, that is adapted to generate a user input control signal. The processing component 105 may be configured to sense control input signals from a user via the control component 125 and respond to any sensed control input signals received therefrom. The processing component 105 may be configured to interpret such a control input signal as a value, as generally understood by one skilled in the art. In one embodiment, the control component 125 may include a control unit (e.g., a wired or wireless handheld control unit) having pushbuttons adapted to interface with a user and receive user input control values. In one implementation, the push buttons of the control unit may be used to control various functions of the imaging system 100, such as autofocus, menu enable and selection, field of view, brightness, contrast, noise filtering, image enhancement, and/or various other features of an imaging system or camera.

The display component 130 includes, in one embodiment, an image display device (e.g., a liquid crystal display (LCD)) or various other types of generally known video displays or monitors. The processing component 105 may be configured to display image data and information on the display component 130. The processing component 105 may be configured to retrieve image data and information from the memory component 110 and display any retrieved image data and information on the display component 130. The display component 130 may include display circuitry, which may be utilized by the processing component 105 to display image data and information. The display component 130 may be adapted to receive image data and information directly from the image capture component 115, processing component 105, and/or image interface 120, or the image data and information may be transferred from the memory component 110 via the processing component 105.

The sensing component 135 includes, in one embodiment, one or more sensors of various types, depending on the application or implementation requirements, as would be understood by one skilled in the art. Sensors of the sensing component 135 provide data and/or information to at least the processing component 105. In one aspect, the processing component 105 may be configured to communicate with the sensing component 135. In various implementations, the sensing component 135 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 135 may represent conventional sensors as generally known by one skilled in the art for monitoring various conditions (e.g., environmental conditions) that may have an effect (e.g., on the image appearance) on the image data provided by the image capture component 115. In one embodiment, the sensing component 135 may include a radar device.

In some implementations, the sensing component 135 (e.g., one or more sensors) may include devices that relay information to the processing component 105 via wired and/or wireless communication. For example, the sensing component 135 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the processing component 105 can use the information (e.g., sensing data) retrieved from the sensing component 135 to modify a configuration of the image capture component 115 (e.g., adjusting a light sensitivity level, adjusting a direction or angle of the image capture component 115, adjusting an aperture, etc.).

In some embodiments, various components of the imaging system 100 may be distributed and in communication with one another over a network 155. In this regard, the imaging system 100 may include a network interface 140 configured to facilitate wired and/or wireless communication among various components of the imaging system 100 over the network 155. In such embodiments, components may also be replicated if desired for particular applications of the imaging system 100. That is, components configured for same or similar operations may be distributed over a network. Further, all or part of any one of the various components may be implemented using appropriate components of the remote device 150 (e.g., a conventional digital video recorder (DVR), a computer configured for image processing, and/or other device) in communication with various components of the imaging system 100 via the network interface 140 over the network 155, if desired. Thus, for example, all or part of the processing component 105, all or part of the memory component 110, and/or all of part of the display component 130 may be implemented or replicated at the remote device 150. In some embodiments, the imaging system 100 may not include imaging sensors (e.g., image capture component 115), but instead receive images or image data from imaging sensors located separately and remotely from the processing component 105 and/or other components of the imaging system 100. It will be appreciated that many other combinations of distributed implementations of the imaging system 100 are possible, without departing from the scope and spirit of the disclosure.

Furthermore, in various embodiments, various components of the imaging system 100 may be combined and/or implemented or not, as desired or depending on the application or requirements. In one example, the processing component 105 may be combined with the memory component 110, image capture component 115, image interface 120, display component 130, sensing component 135, and/or network interface 140. In another example, the processing component 105 may be combined with the image capture component 115, such that certain functions of processing component 105 are performed by circuitry (e.g., a processor, a microprocessor, a logic device, a microcontroller, etc.) within the image capture component 115.

In some embodiments, the imaging system 100 may include one or more additional imaging capture components. The additional imaging capture component(s) may detect the same range (e.g., waveband) of EM radiation or different range of EM radiation from the imaging capture component 115. The imaging capture component 115 and the additional imaging capture component(s) may each provide image data to the image interface 120 (e.g., for processing by the processing component 105). In some embodiments, some of the components of the imaging system 100 may be attached/secured to a vehicle, some of the components of the imaging system 100 may be inside the vehicle, and/or some of the components of the imaging system 100 may be remote from the vehicle. In one aspect, to provide 360° FOV around the vehicle, multiple imaging capture components may be attached/secured to a front-side, a rear-side, a left-side, and a right-side of the vehicle.

Figure 2:
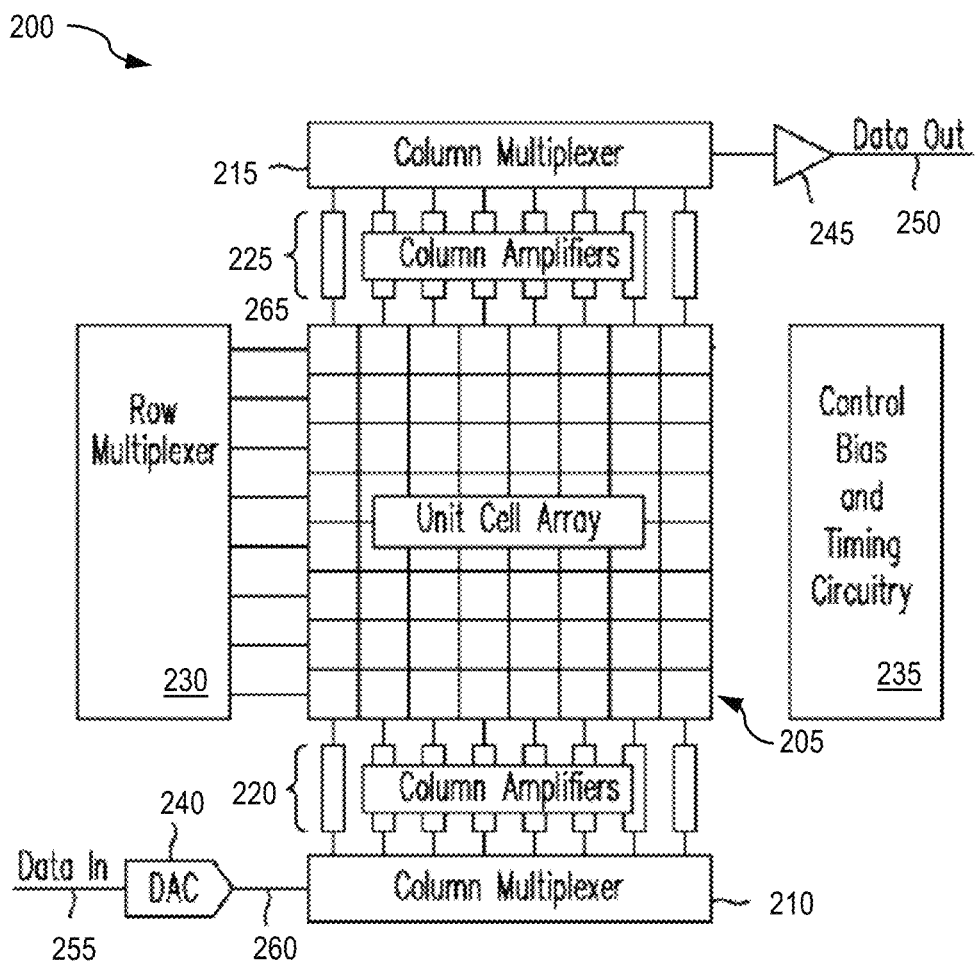
FIG. 2 illustrates a block diagram of an example image sensor assembly in accordance with one or more embodiments of the present disclosure.

FIG. 2 illustrates a block diagram of an example image sensor assembly 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 200 may be an FPA, for example, implemented as the imaging capture component 115 of FIG. 1.

The image sensor assembly 200 includes a unit cell array 205, column multiplexers 210 and 215, column amplifiers 220 and 225, a row multiplexer 230, control bias and timing circuitry 235, a verification value generator 285, a verification circuit 290, a digital-to-analog converter (DAC) 240, and a data output buffer 245. In some aspects, operations of and/or pertaining to the unit cell array 205 and other components may be performed according to a system clock and/or synchronization signals (e.g., line synchronization (LSYNC) signals). The unit cell array 205 includes an array of unit cells. In an aspect, each unit cell may include a detector (e.g., a pixel) and interface circuitry. The interface circuitry of each unit cell may provide an output signal, such as an output voltage or an output current, in response to a detection signal (e.g., detection current, detection voltage) provided by the detector of the unit cell. The output signal may be indicative of the magnitude of EM radiation received by the detector and may be referred to as image pixel data or simply image data. The column multiplexer 215, column amplifiers 220, row multiplexer 230, and data output buffer 245 may be used to provide the output signals from the unit cell array 205 as a data output signal on a data output line 250. The output signals on the data output line 250 may be provided to components downstream of the image sensor assembly 200, such as processing circuitry (e.g., the processing component 105 of FIG. 1), memory (e.g., the memory component 110 of FIG. 1), display device (e.g., the display component 130 of FIG. 1), and/or other component to facilitate processing, storage, and/or display of the output signals. In some cases, the verification circuit 290 may receive data provided on the data output line 250. The data output signal may be an image formed of the pixel values for the image sensor assembly 200. In this regard, the column multiplexer 215, the column amplifiers 220, the row multiplexer 230, and the data output buffer 245 may collectively provide an ROIC (or portion thereof) of the image sensor assembly 200. In an aspect, the interface circuitry may be considered part of the ROIC, or may be considered an interface between the detectors and the ROIC. In an embodiment, components of the image sensor assembly 200 may be implemented such that the unit cell array 205 is hybridized to (e.g., bonded to, joined to, mated to) the ROIC. An example of such a hybridization is described with respect to FIG. 3.

The column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array 205 traverses to get to the column multiplexer 215. As another example, the column amplifiers 225 may include an ADC for converting analog signals to digital signals (e.g., to obtain digital count values). These digital signals may be provided to the column multiplexer 215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., IR light) incident on the detectors of the unit cells. In an aspect, the control bias and timing circuitry 235 may be, may include, or may be a part of, a logic circuit.

In an aspect, the control bias and timing circuitry 235 may generate bias values and timing control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. For example, the DAC 240 may drive digital control signals (e.g., provided as bits) to appropriate analog signal levels for the unit cells. In some technologies, a digital control signal of 0 or 1 may be driven to an appropriate logic low voltage level or an appropriate logic high voltage level, respectively. In another aspect, the control bias and timing circuitry 235 may generate the bias signals (e.g., analog signals) and provide the bias signals to the unit cells without utilizing the DAC 240. In this regard, some implementations do not include the DAC 240, data input signal line 255, and/or analog signal line(s) 260. In an embodiment, the control bias and timing circuitry 235 may be, may include, may be a part of, or may otherwise be coupled to the processing component 105 and/or imaging capture component 115 of FIG. 1.

In some embodiments, the control bias and timing circuitry 235 may generate control signals for addressing the unit cell array 205 (e.g., to turn on or turn off switches of a selection circuit) to allow access to and readout of image data from an addressed portion of the unit cell array 205. In such embodiments, the control bias and timing circuitry 235 may include and/or may be referred to as a control signal generator. For explanatory purposes, the unit cell array 205 may be addressed to access and readout image data from the unit cell array 205 row by row, although in other implementations the unit cell array 205 may be addressed column by column or via other manners. In such cases that the unit cell array 205 is addressed row by row, the control signals are appropriately set to address one row of the unit cell array 205 while not addressing any other row of the unit cell array 205. In this regard, the control signals follow a normal signal pattern sequence for addressing the unit cell array 205 row by row. In some cases, the control signals may be digital control signals (e.g., bits) used to derive appropriate signal levels (e.g., an appropriate logic high voltage level or appropriate logic low voltage level) to cause switches of a selection circuit to turn on or turn off. Such appropriate signal levels may be generated by driver circuits of the unit cell array 205 for example. In other cases, the control signals may be analog signals that are at the appropriate signal levels to cause switches of a selection circuit to turn on or turn off.

In an embodiment, the image sensor assembly 200 may be implemented as part of an imaging system (e.g., 100). In addition to the various components of the image sensor assembly 200, the imaging system may also include one or more processors, memories, logic, displays, interfaces, optics (e.g., lenses, mirrors, beamsplitters), and/or other components as may be appropriate in various implementations. In an aspect, the data output signal on the data output line 250 may be provided to the processors (not shown) for further processing. For example, the data output signal may be an image formed of the pixel values from the unit cells of the image sensor assembly 200. The processors may perform operations such as non-uniformity correction (NUC), spatial and/or temporal filtering, and/or other operations. The images (e.g., processed images) may be stored in memory (e.g., external to or local to the imaging system) and/or displayed on a display device (e.g., external to and/or integrated with the imaging system).

The various components of FIG. 2 may be implemented on a single chip or multiple chips. Furthermore, while the various components are illustrated as a set of individual blocks, various of the blocks may be merged together or various blocks shown in FIG. 2 may be separated into separate blocks.

It is noted that in FIG. 2 the unit cell array 205 is depicted as an 8×8 (e.g., 8 rows and 8 columns of unit cells. However, the unit cell array 205 may be of other array sizes. By way of non-limiting examples, the unit cell array 205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In an aspect, each unit cell of the unit cell array 205 may represent a pixel.

Figure 3:
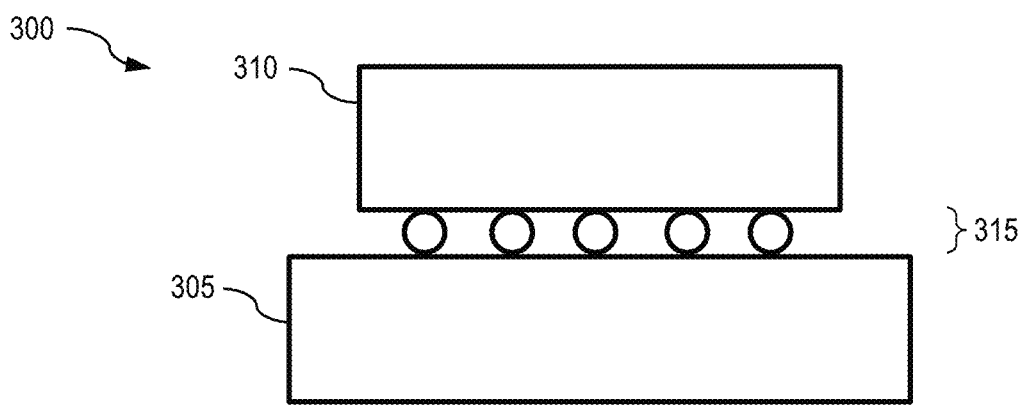
FIG. 3 illustrates an example image sensor assembly in accordance with one or more embodiments of the present disclosure.

In an embodiment, components of the image sensor assembly 200 may be implemented such that a detector array is hybridized to (e.g., bonded to) a readout circuit. For example, FIG. 3 illustrates an example image sensor assembly 300 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 300 may be, may include, or may be a part of the image sensor assembly 200.

The image sensor assembly 300 includes a device wafer 305, a readout circuit 310, and contacts 315 to bond (e.g., mechanically and electrically bond) the device wafer 305 to the readout circuit 310. The device wafer 305 may include detectors (e.g., the unit cell array 205). The contacts 315 may bond the detectors of the device wafer 305 and the readout circuit 310. The contacts 315 may include conductive contacts of the detectors of the device wafer 305, conductive contacts of the readout circuit 310, and/or metallic bonds between the conductive contacts of the detectors and the conductive contacts of the readout circuit 310. In one embodiment, the device wafer 305 may be bump-bonded to the readout circuit 310 using bonding bumps (e.g., indium bumps). The bonding bumps may be formed on the device wafer 305 and/or the readout circuit 310 to allow connection between the device wafer 305 and the readout circuit 310. In an aspect, hybridizing the device wafer 305 to the readout circuit 310 may refer to bonding the device wafer 305 (e.g., the detectors of the device wafer 305) to the readout circuit 310 to mechanically and electrically bond the device wafer 305 and the readout circuit 310.

Figure 4:
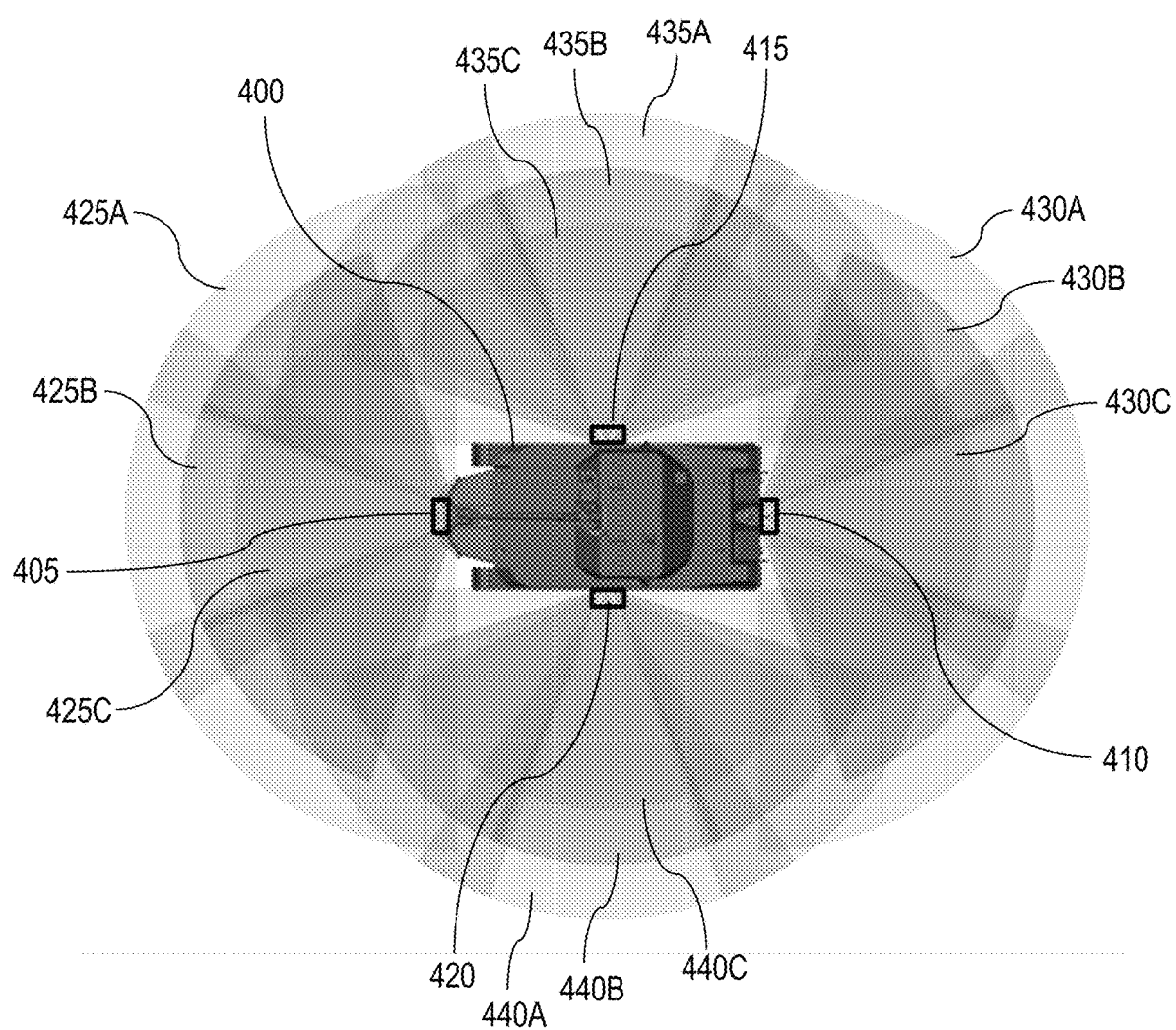
FIG. 4 illustrates an example vehicle having situational awareness devices in accordance with one or more embodiments of the present disclosure.

FIG. 4 illustrates an example vehicle 400 having situational awareness devices 405, 410, 415, and 420 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The situational awareness devices 405, 410, 415, and 420 are distributed at different locations of the vehicle 400 to provide wide FOV awareness around the vehicle 400. In this regard, the situational awareness device 405, 410, 415, and 420 is provided at a front-side, a rear-side, a right-side, and a left-side, respectively, of the vehicle 400. The situational awareness devices 405, 410, 415, and 420 may be attached (e.g., mounted) to the vehicle 400, integrated in the vehicle 400, and/or otherwise coupled/secured to the vehicle 400. In various embodiments, the situational awareness devices 405, 410, 415, and 420 may collectively provide a 360° situational awareness (e.g., also referred to as a 360° FOV) around the vehicle 400. In an embodiment, the situational awareness devices 405, 410, 415, and 420 may collectively form and/or be referred to as a situational awareness system. The situational awareness system may be, may include, or may be a part of, the imaging system 100. Although the situational awareness system of FIG. 4 includes four situational awareness devices with each provided on a side of the vehicle 400, a situational awareness system may include fewer than four, more than four, and/or differently arranged/positioned situational awareness devices from those of the situational awareness system of FIG. 4.

In FIG. 4, each of the situational awareness devices 405, 410, 415, and 420 has three sensor systems, where each of these sensor systems has a respective FOV and captures data associated with a portion of a scene within the sensor system's FOV. In this regard, the situational awareness device 405 has FOVs 425A, 425B, and 425C, the situational awareness device 410 has FOVs 430A, 430B, and 430C, the situational awareness device 415 has FOVs 435A, 435B, and 435C, and the situational awareness device 420 has FOVs 440A, 440B, and 445C. As an example, FIGS. 5A and 5B illustrate situational awareness associated with the vehicle 400 in accordance with one or more embodiments of the present disclosure. In FIG. 5A, objects 505 and 510 (e.g., people) falls at least within the FOV 425A (e.g., one of the front-side FOVs) of the vehicle 400 provided by the situational awareness device 405. In FIG. 5B, objects 515 and 520 falls at least within the FOV 435A (e.g., one of the right-side FOVs) of the vehicle 400 provided by the situational awareness device 415.

For explanatory purposes throughout the present disclosure and by way of a non-limiting example, the sensor systems providing FOVs 425A, 430A, 435A, and 440A may be visible-light imaging systems, the sensor systems providing FOVs 425B, 430B, 435B, and 440B may be infrared sensor systems (e.g., thermal infrared sensor systems), and the sensor systems providing FOVs 425C, 430C, 435C, and 440C may be radar systems. Although in this example each of the situational awareness devices 405, 410, 415, and 420 has the same three types of sensor systems, in other examples the situational awareness devices 405, 410, 415, and 420 may have more, fewer, and/or different types of sensor systems from each other. As another non-limiting example, a situational awareness device may include a visible-light sensor system and/or an infrared sensor system, but not include a radar system. As another non-limiting example, a situational awareness device may include a sensor system(s) for capturing image data of one or more ranges of wavebands outside the visible-light waveband and/or infrared waveband.

In some embodiments, the various FOVs of the situational awareness devices 405, 410, 415, and 420 may overlap to allow improved situational awareness. In this regard, overlap between the FOVs may minimize or avoid blind spots. The FOV 425A of the visible-light sensor system of the situational awareness device 405 overlaps with the FOVs 435A and 440A of the visible-light sensor systems of the situational awareness devices 415 and 420, the FOV 420A of the visible-light sensor system of the situational awareness device 420 overlaps with the FOVs 425A and 430A of the of the visible-light sensor systems of the situational awareness devices 405 and 410, and so forth. Similarly, the FOV 425B of the infrared sensor system of the situational awareness device 405 overlaps with the FOVs 435B and 440B of the infrared sensor systems of the situational awareness devices 415 and 420, the field of view 425C of the radar system of the situational awareness device 405 overlaps with the field of views 435C and 440C of the radar systems of the situational awareness devices 415 and 420, and so forth. In some embodiments, the visible-light sensor systems of the situational awareness devices 405, 410, 415, and 420 collectively provide a 360° FOV or near 360° FOV associated with visible-light imaging, the infrared sensor systems of the situational awareness devices 405, 410, 415, and 420 collectively provide a 360° FOV or near 360° FOV associated with infrared imaging, and the radar systems of the situational awareness devices 405, 410, 415, and 420 collectively provide a 360° FOV or near 360° FOV associated with radar applications.

FIG. 6 illustrates an example system 600 for providing situational awareness for the vehicle 400 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The system 600 includes a situational awareness system 605 and the vehicle 400. The situational awareness system 605 is positioned outside the vehicle 400 and formed of the situational awareness devices 405, 410, 415, and 420. Within the vehicle 400, the vehicle 400 includes a distribution box 610, a processor 615, a display device 620, a vehicle power supply 625, and a network 630. The vehicle power supply 625 may provide power to the various components inside the vehicle 400. In some cases, the vehicle power supply 625 may provide power to the situational awareness system 605 and/or other components (not shown in FIG. 6) coupled (e.g., detachably coupled) to the vehicle 400.

The distribution box 610 is communicably connected to the situational awareness system 605, the processor 615, the vehicle power supply 625, and the network 630. The distribution box 610 may include a data interface(s) (e.g., wired and/or wireless interface) for facilitating data communication (e.g., wired and/or wireless communication) between the situational awareness system 605 and components inside the vehicle 400 and between any two components inside the vehicle 400. In one aspect, the distribution box 610 includes a switch (e.g., a Gigabit Ethernet switch). The distribution box 610 may include a power filter to filter power received via the vehicle power supply 625. The distribution box 610 may distribute the filtered power to components inside the vehicle 400, such as the processor 615. In some cases, the distribution box 610 may provide power to the situational awareness system 605, such as to charge a battery or other power source of the situational awareness devices 405, 410, 415, and 420.

The situational awareness devices 405, 410, 415, and 420 may provide data to the distribution box 610. The data may include images captured by the imaging systems and the radar system of the situational awareness devices 405, 410, 415, and 420. The images captured by the imaging systems may be provided as video data (e.g., a sequence of images). In one aspect, the images from each imaging system may be provided as a real-time streaming protocol (RTSP) stream. For example, the visible-light imaging system may provide an RTSP stream formed of a sequence of visible-light images, and the infrared imaging system may provide an RTSP stream formed of a sequence of infrared images. In some cases, at least a portion of the data from the situational awareness devices 405, 410, 415, and 420 may be encoded data.

The distribution box 610 may provide the data from the situational awareness devices 405, 410, 415, and 420 to the processor 615 for processing. In some aspects, the processor 615 may be a central computer of the vehicle 400. The processor 615 may decode, if needed, the data received via the distribution box 610. The processor 615 may combine (e.g., stitch, merge) at least a subset of the images to generate a wide FOV panoramic image. In some cases, the processor 615 may combine images associated with the same waveband. For example, the processor 615 may combine the visible-light images provided by the visible-light imaging systems of the situational awareness devices 405, 410, 415, and 420 to generate a wide FOV panoramic visible-light image and/or the infrared images provided by the infrared imaging systems of the situational awareness devices 405, 410, 415, and 420 to generate a wide FOV panoramic infrared image. In some aspects, the wide FOV panoramic image includes image data pertaining to a 360° FOV around the vehicle 400. In some cases, the images provided by the imaging systems of the situational awareness devices 405, 410, 415, and 420 may themselves be panoramic images. In these cases, the panoramic images provided by the imaging systems each have a narrower FOV than the wide FOV panoramic image generated by combining these narrower FOV panoramic images.

The processor 615 may perform a detection process (e.g., object detection process) to detect for objects in a wide FOV panoramic image. In some cases, the processor 615 may classify each detected object (e.g., as a person, an animal, a car, a truck, etc.). In an aspect, to detect for objects, the processor 615 may run CNNs on the wide FOV panoramic image. For a given object detected in the wide FOV panoramic image, the processor 615 may annotate one or more of the images used to generate the wide FOV panoramic image. The images used to generate the wide FOV panoramic image generally have overlapping FOVs. The processor 615 may determine whether the object is in the image and, if so, determine a location of the object in the image. As an example, an annotation may include a bounding box overlaid on the image and provided around the object in the image. As another example, alternatively or in addition to the bounding box, text may be overlaid to indicate a classification of the object (e.g., text "car" to classify the object as a car) may be provided near the location of the object, such as outside an outer perimeter of the object to avoid the text covering a portion of the object. In an embodiment, performing a detection process on a single wide FOV panoramic image rather than performing a separate detection process on each image used to generate the wide FOV panoramic image may prevent detecting an object redundantly due to an overlap of FOVs. For example, if an object is present in two of the images used to generate the wide FOV panoramic image, performing a detection process on the wide FOV panoramic image may avoid erroneously identifying this object as being two distinct objects in the case a separate detection process is performed on the two images. Furthermore, a single instantiation of the detection process is generally associated with lower computational computing overhead compared to multiple instantiations of the detection process (e.g., one instantiation for each of the images used to generate the wide FOV panoramic image).

The processor 615 may provide the images and annotations for storage, display, and/or further processing. In some aspects, the annotations may be readily removed from the images. In other aspects, the images may be stored with any annotations added thereto and such that any annotations to an image cannot be readily separated from the image. In some aspects, the images and annotations may be stored separately. The processor 615 may provide the images and annotations to the display device 620. The display device 620 may display the images and the annotations to a user (e.g., a person in the vehicle 400). In some cases, the user may provide input to set whether or not to show the annotations on the images.

The network 630 may facilitate communication between the vehicle 400 and external devices. For example, the network 630 may be used to transmit the images captured by the imaging systems, the wide FOV panoramic image, the radar data, and/or other data from the vehicle 400 to other devices, such as other vehicles and/or a server (e.g., for storing images). The network 630 may also be used to receive data from external devices, such as to receive instructions from a remote control of an operator.

In some embodiments, each of the visible-light sensor systems includes visible-light imaging devices to capture visible-light images. Each visible-light sensor system may generate a panoramic visible-light image based on the visible-light images captured by its visible-light imaging devices. Similarly, each of the infrared sensor systems includes infrared imaging devices to capture infrared images. Each infrared sensor system may generate a panoramic infrared image based on the infrared images captured by its infrared imaging devices.

Figure 7:
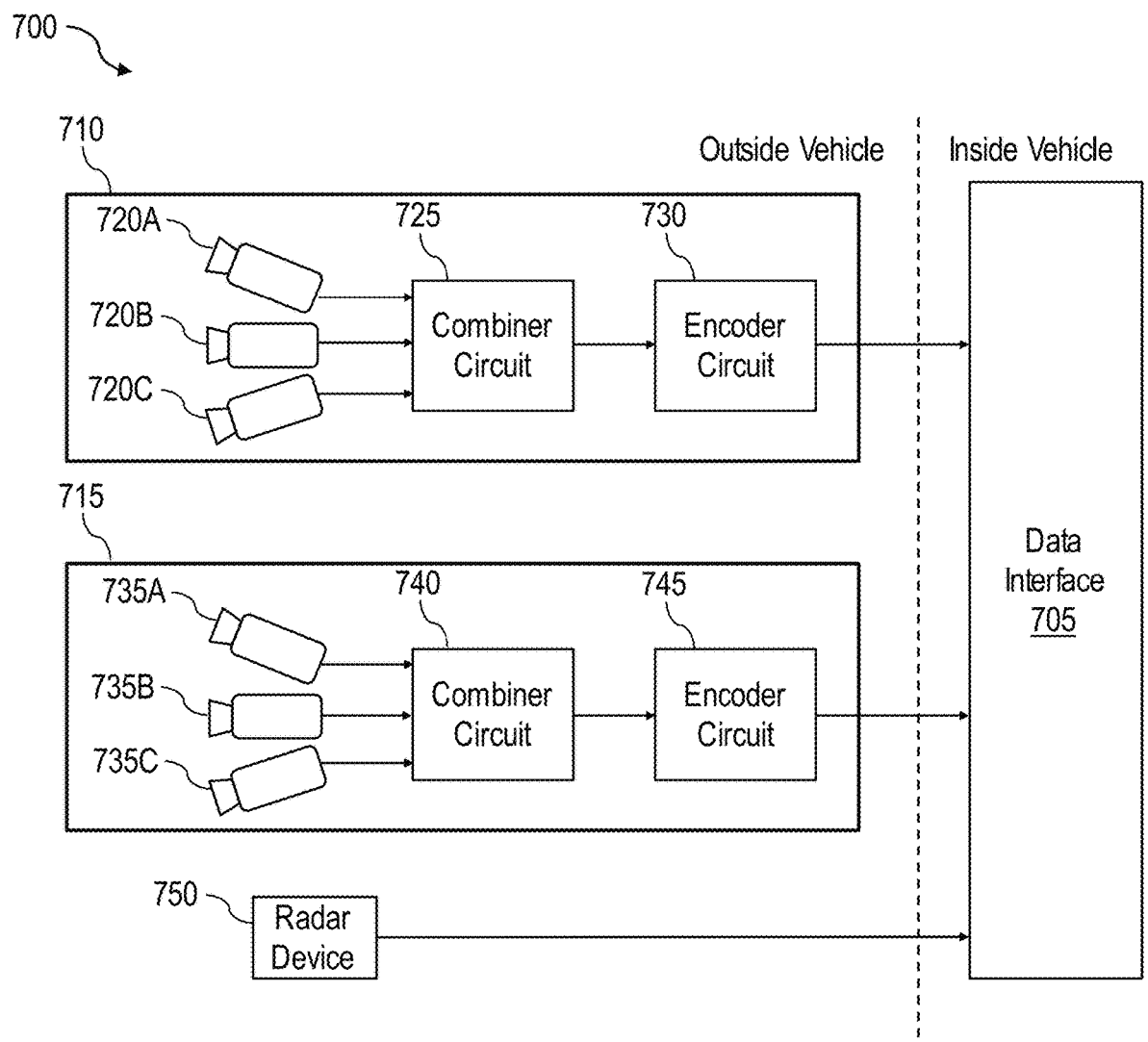
FIG. 7 illustrates an example situational awareness device in accordance with one or more embodiments of the present disclosure.

FIG. 7 illustrates an example situational awareness device 700 in accordance with one or more embodiments of the present disclosure. The situational awareness device 700 is connected to a data interface 705. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, for explanatory purposes, the situational awareness device 600 may be any of the situational awareness devices 405, 410, 415, or 420 of FIG. 4, and/or the data interface 705 may be a part of the distribution box 610 of FIG. 6.

The situational awareness device 700 includes a visible-light (VL) sensor system 710, an infrared (IR) sensor system 715, and a radar device 750. The VL sensor system 710 includes VL imaging devices 720A, 720B, and 720C, a combiner circuit 725, and an encoder circuit 730. Each of the VL imaging devices 720A, 720B, and 720C may capture visible-light images associated with a portion of a scene within each VL imaging device's FOV. The combiner circuit 725 combines (e.g., merges, stitches) the visible-light images from the VL imaging devices 720A, 720B, and 720C to generate a panoramic visible-light image. Such combining takes into consideration overlap between the FOVs of the VL imaging devices 720A, 720B, and 720C. The encoder circuit 730 encodes the panoramic visible-light image and provides the encoded panoramic visible-light image to the data interface 705. In some cases, the encoder circuit 730 may encode the panoramic visible-light image to reduce a size of the panoramic visible-light image, package the panoramic visible-light image (e.g., into a size and/or format appropriate for the data interface 705 and/or components downstream of the data interface 705), and/or otherwise to facilitate storage, display, and/or further processing of the panoramic visible-light image. For example, the encoding may include h.264 encoding, encoding appropriate for an RTSP stream, and/or other encoding.

The IR sensor system 715 includes IR imaging devices 735A, 735B, and 735B (e.g., thermal infrared imaging devices), a combiner circuit 740, and an encoder circuit 745. Each of the IR imaging devices 735A, 735B, and 735B may capture infrared images associated with a portion of the scene within each IR imaging device's FOV. The combiner circuit 740 combines (e.g., merges, stitches) the infrared images from the IR imaging devices 735A, 735B, and 735C to generate a panoramic infrared image. The encoder circuit 745 encodes the panoramic infrared image and provide the encoded panoramic infrared image to the data interface 705. In some cases, the encoder circuit 730 and/or 745 may be optional. For example, in some implementations, the panoramic images provided by the combiner circuits 725 and/or 740 may have appropriate characteristics (e.g., size, format, etc.) for the data interface 705 and/or for components (e.g., interfaces, circuitry) downstream of the data interface 705.

The radar device 750 captures radar data of the scene. The radar data may be used to perform object avoidance to facilitate navigation of a vehicle (e.g., the vehicle 400). In some embodiments, the radar data may be primarily used to detect objects in a vicinity of the vehicle to aid in parking of the vehicle or exiting the vehicle from a parked position. In some aspects, object detection using the radar data is independent of object detection using the image data.

In some embodiments, the images captured by one or more of the image devices 720A-C and 735A-C may be processed to facilitate display, storage, and/or further processing of the images. Such processing of the captured images may include panning, cropping, brightness matching, warping, encrypting, and/or other processes. In some cases, such processing may be performed on the images and these processed images provided to the combiner circuits 725 and 740 to generate panoramic images. Although in FIG. 7 the data interface 705 receives an output of the encoder circuits 730 and 745 and the radar device 720, in some cases, the data interface 705 may receive the images captured by the imaging devices 720A-C and 730A-C and/or processed versions thereof (e.g., cropped, panned).

Figure 8:
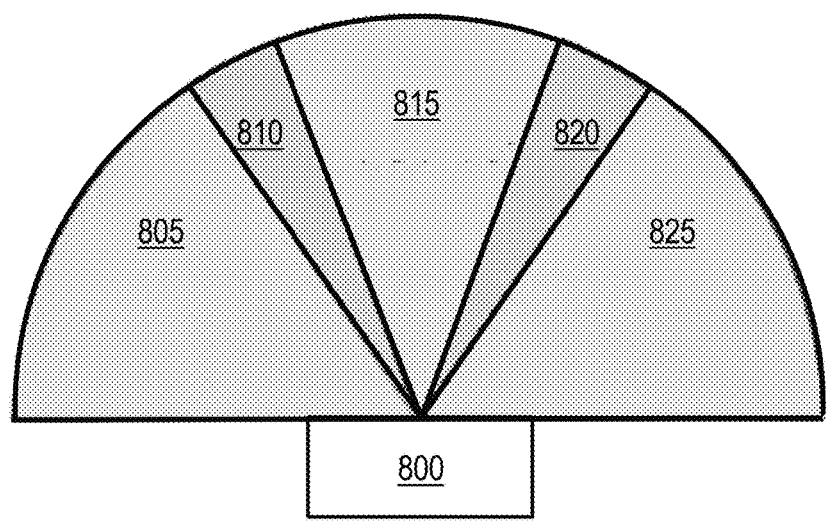
FIG. 8 illustrates an example imaging system in accordance with one or more embodiments of the present disclosure.

FIG. 8 illustrates an example imaging system 800 in accordance with one or more embodiments of the present disclosure. In an embodiment, the imaging system 800 may be an imaging system (e.g., visible-light imaging system, infrared imaging system) of one of the situational awareness devices 405, 410, 415, and 420 of FIG. 4. For explanatory purposes, the imaging system 800 is the imaging system 710 of FIG. 7.

An FOV of the imaging system 800 is nominally 180° and is provided by FOV portions 805, 810, 815, 820, and 825. The FOV portions 805, 810, 815, 820, and 825 may provide a nominal FOV of 55°, 15°, 40°, 15°, and 55°, respectively. In this regard, the FOV portions 805 and 810 may collectively provide a nominal 70° FOV, the FOV portions 810, 815, and 820 may collectively provide a nominal 70° FOV, and the FOV portions 820 and 825 may collectively provide a nominal 70° FOV. The imaging device 720A may capture image data in the FOV portions 805 and 810, the imaging device 720B may capture image data in the FOV portions 810, 815, and 820, and the imaging device 720C may capture image data in the FOV portions 820 and 825.

Figures 9A, 9B, 9C:
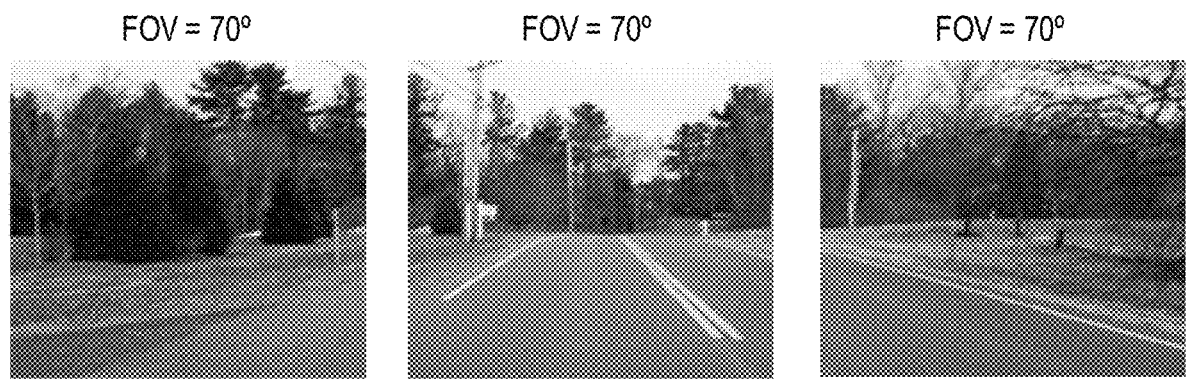
FIGS. 9A, 9B, and 9C illustrate images captured by imaging devices of the imaging system of FIG. 8.
Figure 10:
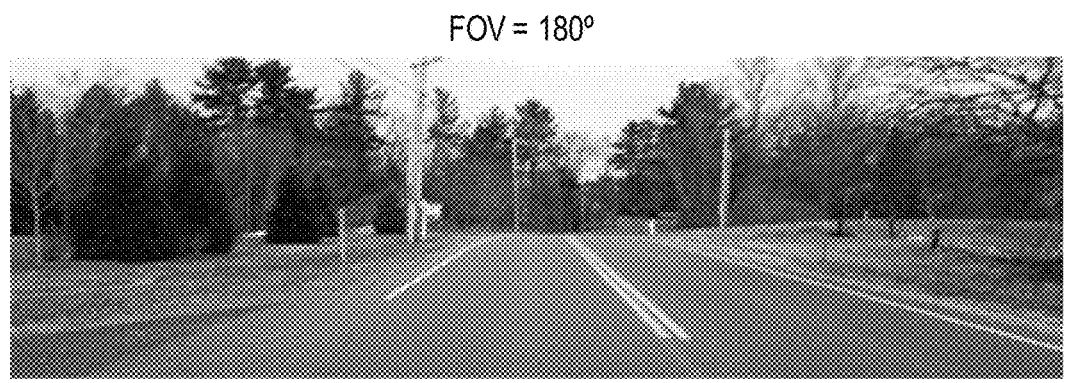
FIG. 10 illustrates a panoramic image obtained by combining the images of FIGS. 9A, 9B, and 9C.

FIGS. 9A, 9B, and 9C illustrate images captured by the imaging device 720A, 720B, and 720C, respectively, at the same or substantially the same time. In this regard, each of the images capture a nominal FOV of 70°. FIG. 10 illustrates a panoramic image obtained by combining (e.g., stitching) the images of FIGS. 9A, 9B, and 9C. The panoramic image captures a nominal FOV of 180°. The panoramic image may be generated using a combiner circuit of the imaging system 800. By combining (e.g., stitching, merging) images captured by the imaging devices 720A-C, the combined images may provide a panoramic wide FOV in a spectrum of interest captured by the imaging devices 720A-C. In some cases, overlapping FOVs (e.g., the FOV portions 810 and 820) may facilitate depth perception and three-dimensional visibility. In some cases, a combined image generated by stitching multiple images (e.g., multiple overlapping images) may be more natural in appearance and less distorted than an image captured using a wide angle lens (e.g., an image from a wide angle lens may have distortion).

Figure 11:
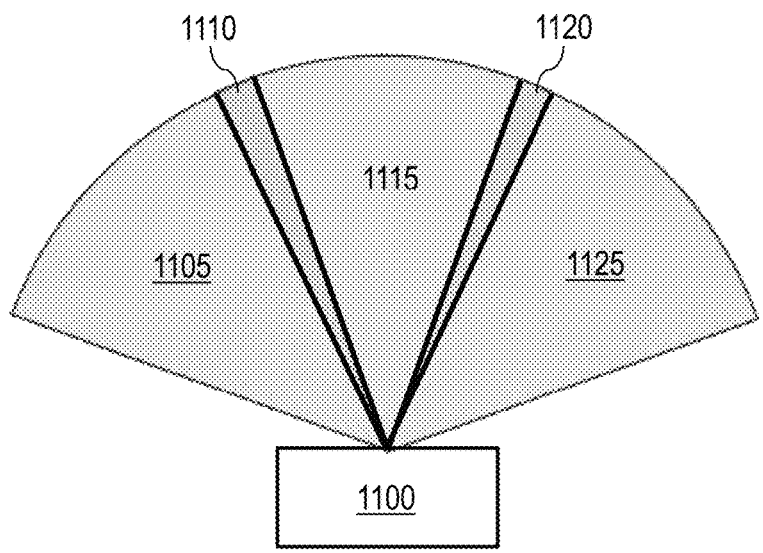
FIG. 11 illustrates another example imaging system in accordance with one or more embodiments of the present disclosure.

FIG. 11 illustrates another example imaging system 1100 in accordance with one or more embodiments of the present disclosure. In an embodiment, the imaging system 1100 may be an imaging system (e.g., visible-light imaging system, infrared imaging system) of one of the situational awareness devices 405, 410, 415, and 420 of FIG. 4. For explanatory purposes, the imaging system 1100 is the imaging system 715 of FIG. 7.

An FOV of the imaging system 1100 is nominally 140° and is provided by FOV portions 1105, 1110, 1115, 1120, and 1125. The FOV portions 1105, 1110, 1115, 1120, and 1125 may provide a nominal FOV of 45°, 5°, 40°, 5°, and 45°, respectively. In this regard, the FOV portions 1105 and 1110 may collectively provide a nominal 50° FOV, the FOV portions 1110, 1115, and 1120 may collectively provide a nominal 50° FOV, and the FOV portions 1120 and 1125 may collectively provide a nominal 50° FOV. The imaging device 735A may capture image data in the FOV portions 1105 and 1110, the imaging device 735B may capture image data in the FOV portions 1110, 1115, and 1120, and the imaging device 735C may capture image data in the FOV portions 1120 and 1125.

Figure 12A:
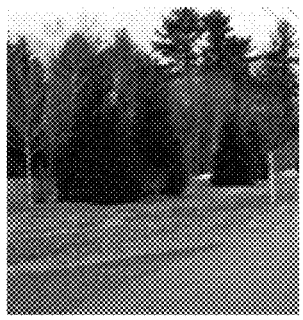
FIGS. 12A, 12B, and 12C illustrate images captured by imaging devices of the imaging system of FIG. 11.
Figure 12B:
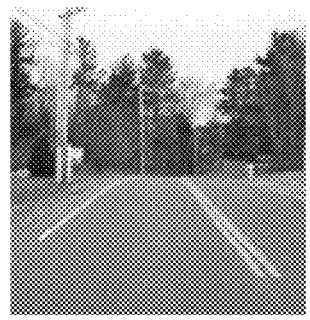
Figure 12C:
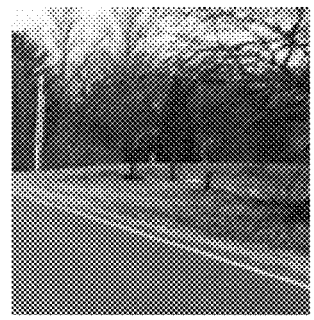
Figure 13:
FIG. 13 illustrates a panoramic image obtained by combining the images of FIGS. 12A, 12B, and 12C.

FIGS. 12A, 12B, and 12C illustrate images captured by the imaging device 735A, 735B, and 735C, respectively, at the same or substantially the same time. In this regard, each of the images capture a nominal FOV of 50°. FIG. 13 illustrates a panoramic image obtained by combining (e.g., stitching) the images of FIGS. 12A, 12B, and 12C. The panoramic image captures a nominal FOV of 140°. The panoramic image may be generated using a combiner circuit of the imaging system 1100.

Although FIGS. 8 and 11 illustrate an example in which each imaging device nominally has a 70° FOV and 50° FOV, respectively, the imaging devices of an imaging system may have different FOVs from each other and/or an amount of overlap of the FOVs between any two of the imaging devices may be different. In this regard, the imaging devices of an imaging system may be the same (e.g., same cameras/specifications) or may be different.

Figure 14:
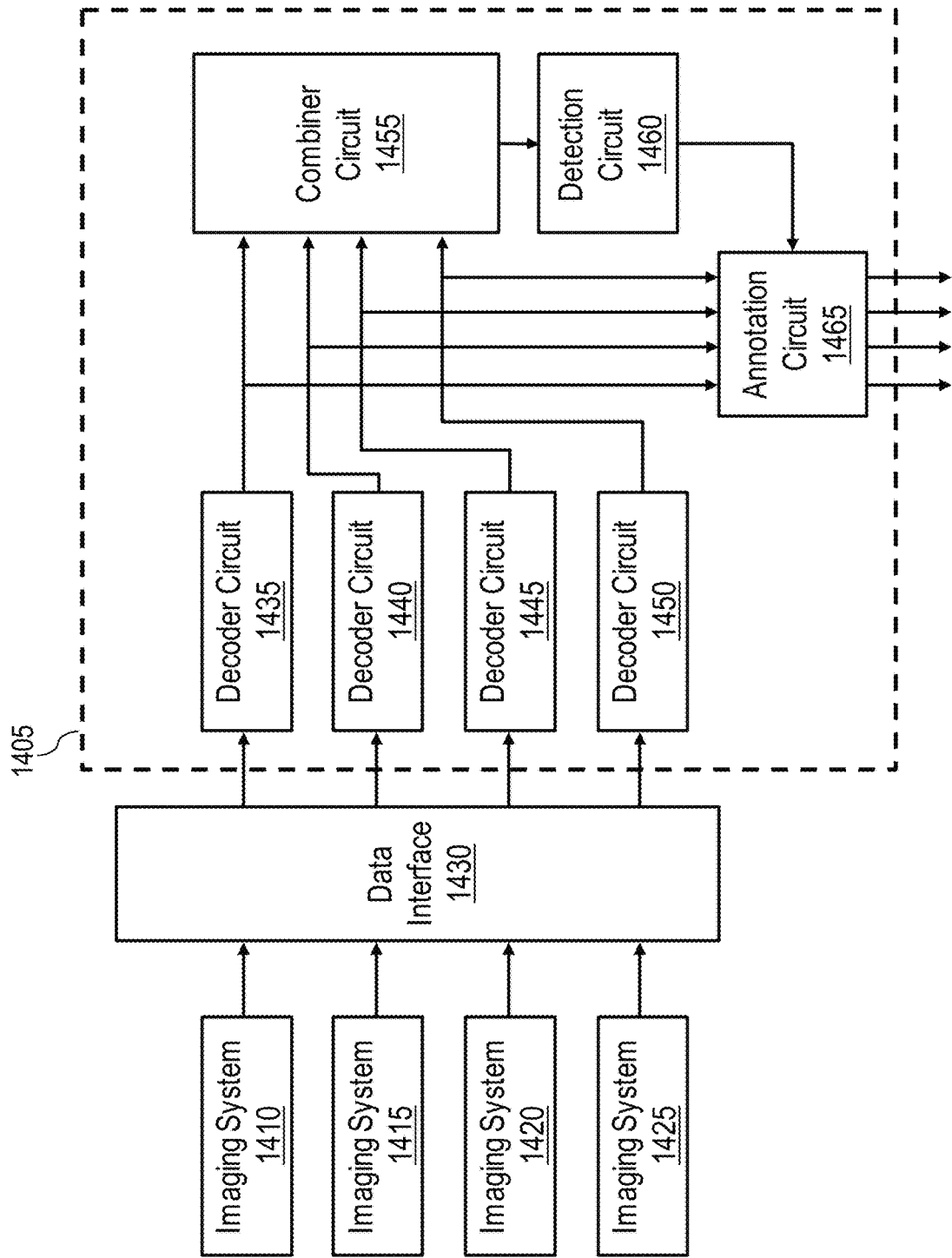
FIG. 14 illustrates an example processing system for facilitating situational awareness-based image annotation in accordance with one or more embodiments of the present disclosure.

FIG. 14 illustrates an example processing system 1405 for facilitating situational awareness-based image annotation in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

Imaging systems 1410, 1415, 1420, and 1425 provide images to a data interface 1430. In an embodiment, the imaging systems 1410, 1415, 1420, and 1425 may be imaging systems of the situational awareness devices 405, 410, 415, and 420, respectively. In some aspects, one or more of the imaging systems 1410, 1415, 1420, and 1425 may provide panoramic images to the data interface 1430. As one example, the imaging system 1410 may include the imaging system 710 of FIG. 7. The data interface 1430 provides the images received from the imaging systems 1410, 1415, 1420, and 1425 to the processing system 1405.

In an embodiment, the imaging systems 1410, 1415, 1420, and 1425 provide a stream of panoramic images (e.g., stream of visible-light panoramic images) to the data interface 1430. The data interface 1430 provides the streams of panoramic images to decoder circuits 1435, 1440, 1445, and 1450. The decoder circuits 1435, 1440, 1445, and 1450 may decode the streams of panoramic images provided by the imaging systems 1410, 1415, 1420, and 1425, respectively. In some cases, the streams of panoramic images from the imaging systems 1410, 1415, 1420, and 1425 may include streams of images encoded using h.264 encoding and RTSP encoding. In such cases, the decoding circuits 1435, 1440, 1445, and 1450 may each have a RTSP reader followed by an h.264 decoder.

The decoder circuits 1435, 1440, 1445, and 1450 provides the decoded streams of panoramic images to a combiner circuit 1455. The combiner circuit 1455 combines (e.g., merges, stitches) the four streams of panoramic images to generate a panoramic image having an FOV wider than an individual FOV of the panoramic images provided by the decoder circuits 1435, 1440, 1445, and 1450. Such combining takes into consideration overlap between FOVs captured in the decoded panoramic images. In some aspects, the panoramic image generated by the combiner circuit 1455 has a 360° FOV (e.g., to provide 360° situational awareness). In an aspect, the panoramic image generated by the combiner circuit 1455 may be referred to as a wide FOV or wider FOV panoramic image whereas the panoramic images provided by the decoder circuit 1435, 1440, 1445, and 1450 may be referred to as narrower FOV panoramic images.

A detection circuit 1460 receives the panoramic image from the combiner circuit 1455 and performs a detection process on the wide FOV panoramic image to detect for object in the wide FOV panoramic image. In some cases, the detection circuit 1460 may classify detected objects (e.g, as a person, an armed person, a truck, a car, a military vehicle). The detection circuit 1460 may generate data (e.g., metadata) indicative of a result of the detection process may be provided to an annotation circuit 1465. In some cases, the data may include information pertaining to a location of each object in the wide FOV panoramic image. In some aspects, the detection process may be performed by running CNNs over the wide FOV panoramic image.

The annotation circuit 1465 uses the data to annotate the narrower panoramic images. The annotation circuit 1465 may use the data from the detection circuit 1460 and knowledge pertaining to an overlap geometry associated with the narrower FOV panoramic images to determine, for a given object detected by the detection circuit 1460 in the wide FOV panoramic image, whether and which of these individual narrower panoramic images contain the object. In this regard, the annotation circuit 1465 may determine where within the narrower FOV panoramic images to annotate to indicate a location of the object detected in the narrower FOV panoramic images. For example, for a given object of interest detected in the wide FOV panoramic image, the annotation circuit 1465 may add a bounding box around the object, a label (e.g., a name or an identifier of the object), and/or other annotation to one or more of the narrower FOV panoramic images. The annotated panoramic images may be provided for display, storage, and/or further processing. In some cases, some of the narrower FOV panoramic images output by the annotation circuit 1465 are left unannotated and identical to those output by the decoder circuits 1435, 1440, 1445, and/or 1450 (e.g., no objects detected in the wide FOV panoramic image are associated with these unannotated narrower FOV panoramic images). In some cases, a user (e.g., an operator of the vehicle 400 and/or device external to the vehicle 400) may select between providing, for display, storage, and/or further processing, the annotated panoramic images and/or the panoramic images without annotation. In some embodiments, by performing the detection process on the single wide FOV panoramic image from the combiner circuit 1455 rather than performing a detection process on each of the narrower FOV panoramic images from the decoder circuits 1435, 1440, 1445, and 1450, the processing system 1405 may avoid erroneous target identifications in which the same object is identified as being two separate objects.

It is noted that the data interface 1430 and the processing system 1405 may be expanded from that shown in FIG. 14 to accommodate additional imaging systems. The additional imaging systems may include imaging systems that capture image data in the same waveband as the imaging systems 1410, 1415, 1420, and 1425, in which this image data from the additional imaging systems may be combined with that from the imaging systems 1410, 1415, 1420, and 1425. Alternatively or in addition, the additional imaging systems may include imaging systems that capture image data in a different waveband as the imaging systems 1410, 1415, 1420, and 1425. The processing system 1405 may generate a wide FOV panoramic image based on images from these additional imaging systems.

Figure 15:
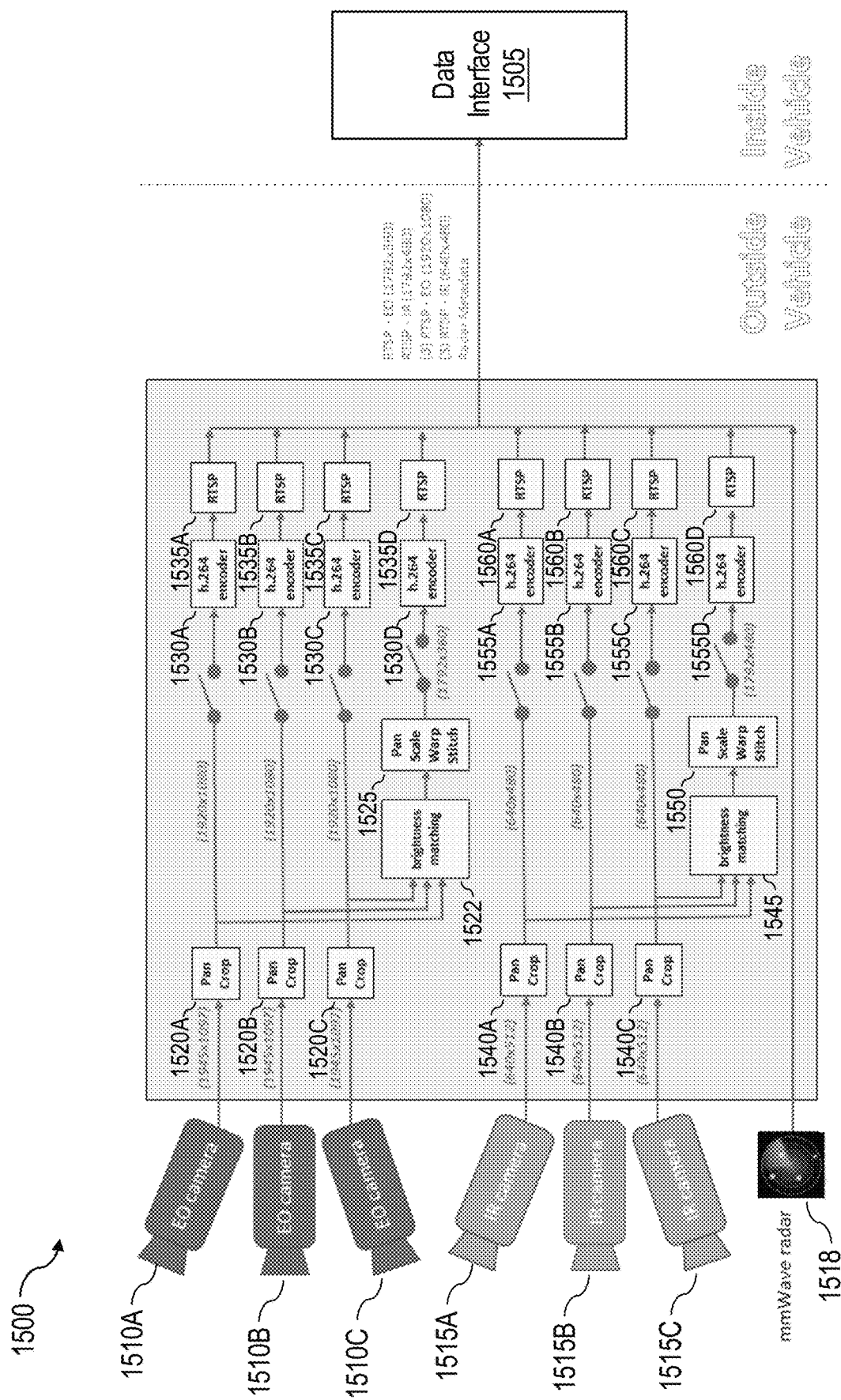
FIG. 15 illustrates an example situational awareness device in accordance with one or more embodiments of the present disclosure.

FIG. 15 illustrates an example situational awareness device 1500 in accordance with one or more embodiments of the present disclosure. The description for FIG. 7 generally applies to FIG. 15, with examples of differences and other description provided herein. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The situational awareness device 1500 includes a data interface 1505, electro-optic (EO) imaging devices 1510A, 1510B, and 1510C, IR imaging devices 1515A, 1515B, and 1515C, and a radar device 1518. In some aspects, EO may include visible-light and in some cases near IR. The EO imaging devices 1510A-C may capture images. The images captured by the EO imaging devices 1510A, 1510B, and 1510C may be processed by blocks 1520A, 1520B, and 1520C, respectively, to pan and/or crop the images. The images may be brightness matched by a block 1522 and combined by a block 1525. The block 1525 may also pan, scale, and/or warp the images. An output of the block 1525 is a panoramic image. Images output by the blocks 1520A, 1520B, and 1520C are decoded by h.264 encoders 1530A, 1530B, and 1530C and RTSP blocks 1535A, 1535B, and 1535C, respectively.

Similarly, the IR imaging devices 1515A-C may capture images. The images captured by the IR imaging devices 1515A, 1515B, and 1515C may be processed by blocks 1540A, 1540B, and 1540C, respectively, to pan and/or crop the images. The images may be brightness matched by a block 1545 and combined by a block 1550. The block 1550 may also pan, scale, and/or warp the images. An output of the block 1525 is a panoramic image. Images output by the blocks 1520A, 1520B, and 1520C are decoded by h.264 encoders 1555A, 1555B, and 1555C and RTSP blocks 1560A, 1560B, and 1560C, respectively. Switches may be provided to selectively process and selectively provide to the data interface 1505, the images from the imaging devices 1510A-C or 1515A-C and/or the EO panoramic image or the IR panoramic image. In this manner, a user may access the images captured by the imaging devices 1510A-C and/or 1515A-C directly. In some aspects, such as in systems with more storage area and/or more processing capabilities, the switches are optional. FIG. 15 provides example dimensions of each of the various images.

Figure 16:
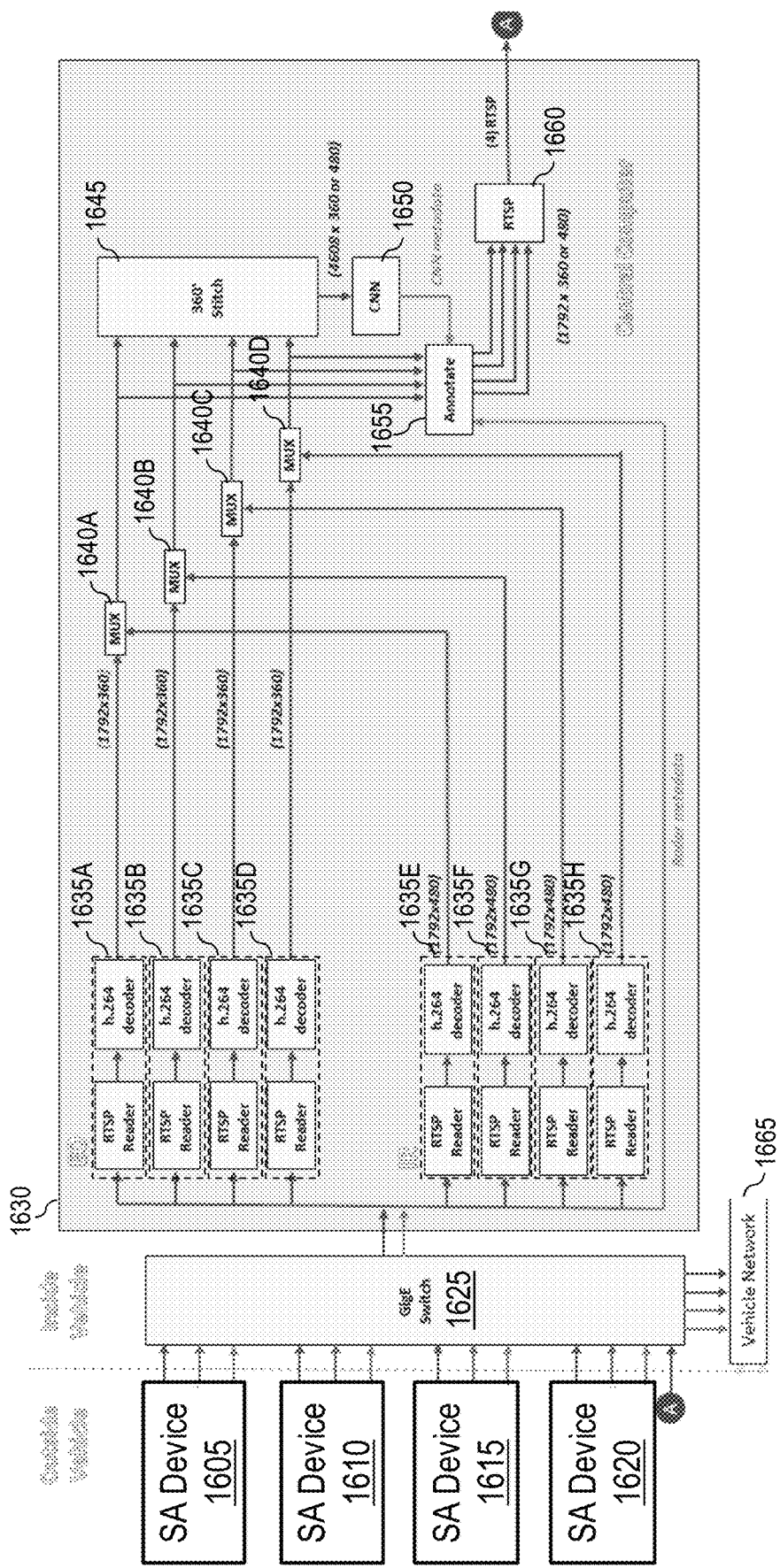
FIG. 16 illustrates an example system for facilitating situational awareness-based image annotation in accordance with one or more embodiments of the present disclosure.

FIG. 16 illustrates an example system 1600 in accordance with one or more embodiments of the present disclosure. The description of FIG. 14 generally applies to FIG. 16, with examples of differences and other description provided herein. The system 1600 includes situational awareness devices 1605, 1610, 1615, and 1620, a data interface 1625, and a processor 1630. In an embodiment, the situational awareness devices 1605, 1610, 1615, and 1620 may be, may include, or may be a part of the situational awareness devices 405, 410, 415, and 420, the data interface 1625 may be, may include, or may be a part of the distribution box 610, and/or the processor 1630 may be, may include, or may be a part of the processor 615.

The situational awareness devices 1605, 1610, 1615, and 1620 may each provide to the data interface 1625 a first stream of panoramic images (e.g., visible-light panoramic images), a second stream of panoramic images (e.g., infrared panoramic images), and radar data. The data interface 1625 provides the streams of panoramic images to decoder circuits 1635A-H. The decoder circuits 1635A, 1635B, 1635C, and 1635D may decode the first streams of panoramic images provided by the situational awareness devices 1605, 1610, 1615, and 1620, respectively. The decoder circuits 1635E, 1635F, 1635G, and 1635H may decode the second streams of panoramic images provided by the situational awareness devices 1605, 1610, 1615, and 1620, respectively. In one aspect, as shown in FIG. 16, the decoding circuits 1635A-H may have an RTSP reader followed by an h.264 decoder. In other aspects, the decoding circuits may be optional (e.g., based on implementation of the situational awareness devices 1605, 1610, 1615, and 1620, the data interface 1625, and/or the processor 1630).

Multiplexers 1640A, 1640B, 1640C, and 1640D are used to select between an output of the decoder circuits 1635A and 1635E, the decoder circuits 1635B and 1635F, the decoder circuits 1635C and 1635G, and the decoder circuits 1635D and 1635H, respectively. In this regard, the multiplexers 1640A-D may be used as switches to select the four first streams of panoramic images (e.g., streams of visible-light panoramic images) or to select the four second streams of panoramic images (e.g., streams of infrared panoramic images). In these aspects, a combiner circuit 1645 selectively combines (e.g., merges, stitches) the four first streams of panoramic or the four second streams of panoramic images based on whether the decoding circuits 1635A-D or the decoding circuits 1635E-H are connected to the combiner circuit 1645 via the multiplexers 1640A-D. In some cases, selection by the multiplexers 1640A-D may be based on user input. In some cases, the multiplexers 1640A-D may be used to time-multiplex the first streams of panoramic images and the second streams of panoramic images, such that the first streams may be processed first to generate a first panoramic image and then the second streams may be processed to generate a second panoramic image, or vice versa. In some aspects, other types of switches may be used alternative or in addition to multiplexers. In some embodiments, the multiplexers are optional. For example, in cases with more available processing resources, the combiner circuit 1645 may process the four first streams and the four second streams at the same or substantially the same time to generate a respective expanded FOV (e.g., 360° FOV) panoramic image for each set of four streams.

The detection circuit 1650 receive a panoramic image from the combiner circuit 1645 and perform a detection process to detect for objects in the panoramic image. In some aspects, such as shown in FIG. 16, the detection process may be performed using CNNs. In some cases, the detection circuit 1650 may classify detected objects (e.g., as a person, an armed person, a truck, a car, a military vehicle). Data (e.g., metadata) indicative of a result of the detection process may be provided to an annotation circuit 1655. The annotation circuit 1655 uses the data to annotate the panoramic image from the combiner circuit 1645. In an embodiment, for a given wide FOV panoramic image and narrower FOV panoramic images used to generate the wide FOV panoramic image, operations performed by the combiner circuit 1455, detection circuit 1460, and annotation circuit 1465 of FIG. 14 generally apply to the combiner circuit 1645, detection circuit 1650, and annotation circuit 1655 of FIG. 16. Annotated narrower FOV panoramic images may be provided by the annotation circuit 1655 to a block 1660 to facilitate storage, display, and/or further processing of the annotated narrower FOV panoramic images. The block 1660 may provide the annotated panoramic images to the data interface 1625. In some cases, the annotation circuit 1655 may generate the annotated panoramic images independent of any radar metadata received by the annotation circuit 1655. In some cases, annotations in the annotated panoramic images may be based at least in part on the radar metadata. In some cases, as previously indicated, situational devices do not include radar devices. FIG. 16 provides example dimensions of each of the various images.

A network 1665 may facilitate communication between a vehicle and external devices. For example, the network 1665 may be used to transmit data provided by the situational awareness devices 1605, 1610, 1615, and 1620, panoramic images provided by the annotation circuit 1655, and/or other data from the vehicle to other devices, such as other vehicles and/or a server (e.g., for storing images). The network 1665 may also be used to receive data from external devices, such as to receive instructions from a remote control of an operator to operate the multiplexers 1640A-D.

Figure 17:
FIG. 17 illustrates an example display screen with images displayed thereon in accordance with one or more embodiments of the present disclosure.

FIG. 17 illustrates an example display screen 1700 with images 1705, 1710, 1715, and 1720 displayed thereon in accordance with one or more embodiments of the present disclosure. The display device 1700 may be provided for viewing by a driver of a vehicle (e.g., the vehicle 400). The images 1705, 1710, 1715, and 1720 may be a front-side image, left-side image, right-side image, and a rear-side image, respectively. In an embodiment, the images 1705, 1710, 1715, and 1720 may be, or may be based on, images (e.g., panoramic images) provided by the situational awareness devices 405, 420, 415, and 410, respectively. In FIG. 17, the image 1720 is flipped horizontally relative to an image captured by the situational awareness device 410 to facilitate user viewing (e.g., such that the image 1720 provides a perspective similar to that provided by a rear view mirror). In other cases, the rear view image is not flipped horizontally. In an embodiment, the images 1705, 1710, 1715, and 1720 may be annotated panoramic images generated by annotation circuits (e.g., 1465 or 1655). In this regard, the image 1710 includes annotations 1725 and 1730 (e.g., bounding boxes around cars). The display screen 1700 includes a switch 1735 to allow the user to select (e.g., toggle) between viewing EO images (as shown in FIG. 17) or IR images. In some cases, the user may select which of the images 1705, 1710, 1715, and 1720 to display. FIG. 17 provides example dimensions of each of the images 1705, 1710, 1715, and 1720.

Figure 18:
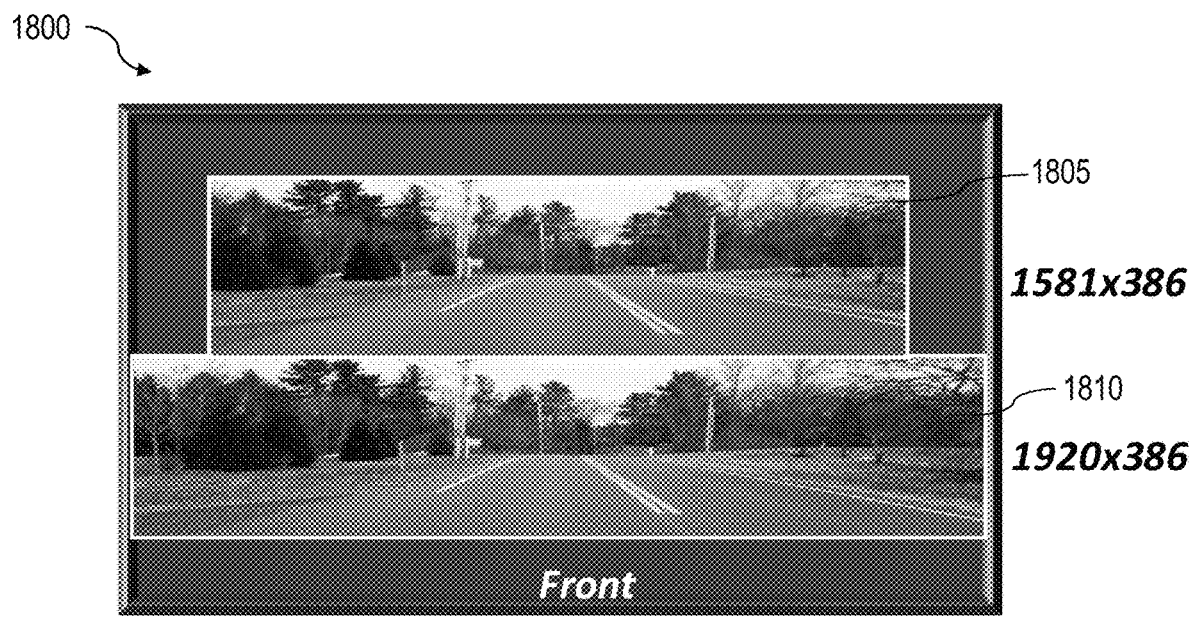
FIG. 18 illustrates an example display screen with images displayed thereon in accordance with one or more embodiments of the present disclosure.

FIG. 18 illustrates an example display screen 1800 with images 1805 and 1810 displayed thereon in accordance with one or more embodiments of the present disclosure. The display screen 1800 may be provided for viewing by a driver of a vehicle (e.g., the vehicle 400). The images 1805 and 1810 are a front-side IR image and a corresponding front-side VL image. In an embodiment, the images 1805 and 1810 may be, or may be based on, images (e.g., panoramic images) provided by the situational awareness device 405 (e.g., the forward-facing situational awareness device). In an embodiment, the images 1805 and 1810 may be annotated panoramic images generated by annotation circuits (e.g., 1465 or 1655). In some cases, the display screen 1700 and 1800 may be different display screens available simultaneously to the user. In some cases, the user may configure one or more display screens to display the images 1705, 1710, 1715, and 1720 as shown in FIG. 17, the images 1805 and 1810 as shown in FIG. 18, or any combination of images accessible to and desired by the user. FIG. 18 provides example dimensions of the images 1805 and 1810.

Figure 19:
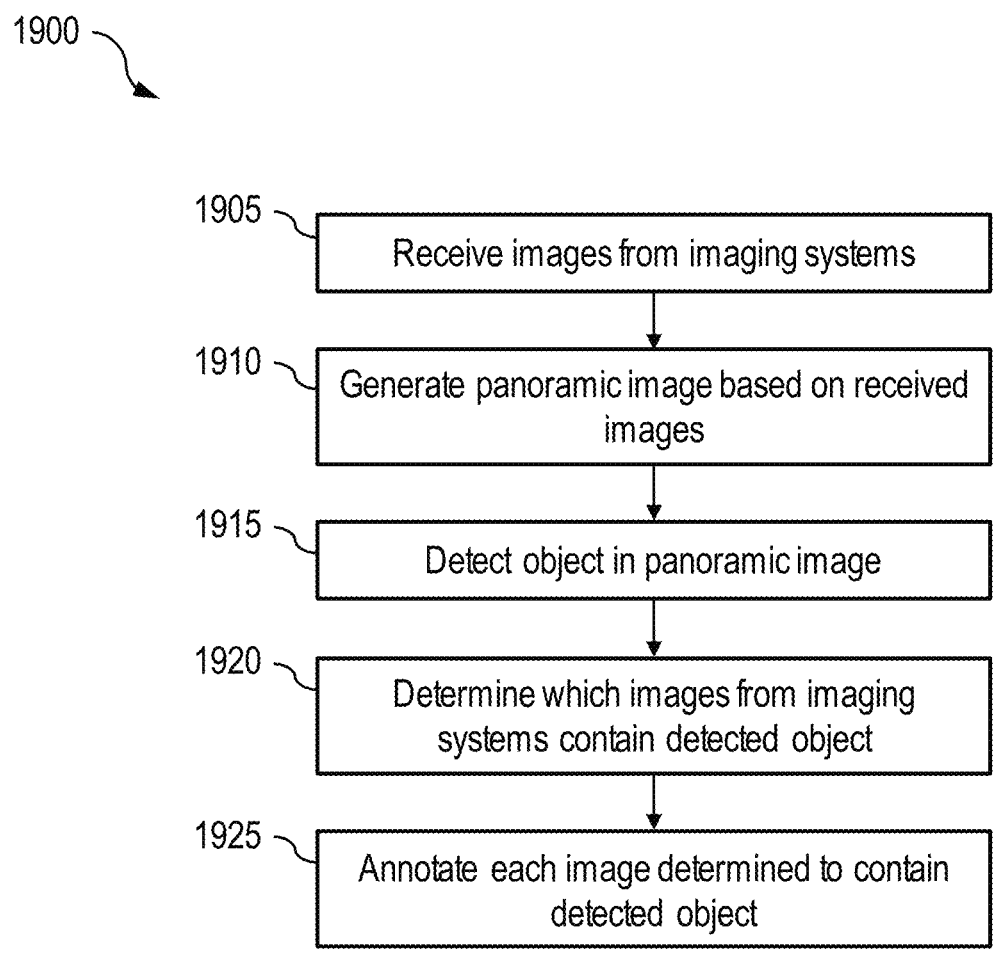
FIG. 19 illustrates a flow diagram of an example process for facilitating situational awareness-based image annotation in accordance with one or more embodiments of the present disclosure.

FIG. 19 illustrates a flow diagram of an example process 1900 for facilitating situational awareness-based image annotation in accordance with one or more embodiments of the present disclosure. Although the process 1900 is primarily described herein with reference to the system 1400 of FIG. 14 for explanatory purposes, the process 1900 can be performed in relation to other systems for facilitating situational awareness-based image annotation. Note that one or more operations in FIG. 19 may be combined, omitted, and/or performed in a different order as desired.

At block 1905, the combiner circuit 1455 receives images provided by the imaging systems 1410, 1415, 1420, and 1425 of situational awareness devices. In some cases, the images may be provided via the data interface 1430 and one or more multiplexers (e.g., as shown in FIG. 16). Each of these images may be a part of a respective stream (e.g., RTSP stream) of video data (e.g., sequence of images) provided by the imaging systems 1410, 1415, 1420, and 1425. In some cases, the images provided by the imaging systems 1410, 1415, 1420, and 1425 may be panoramic images. Each of these panoramic images may be generated by combining (e.g., stitching, merging) images captured by imaging devices of each of the imaging systems 1410, 1415, 1420, and 1425. At block 1910, the combiner circuit 1455 generates a wide FOV panoramic image based on the received images. At block 1915, the detection circuit 1460 detects an object in the wide FOV panoramic image. In some cases, the detection circuit 1460 may be detecting for objects determined to be of interest (e.g., based on application). In some cases, detection of objects may be based on CNNs, with the CNNs appropriately trained to detect for objects of interest.

At block 1920, the annotation circuit 1465 determines which of the images received from the imaging systems 1410, 1415, 1420, and 1425 contains (e.g., includes, captures) the object detected at block 1915. In other words, the annotation circuit 1465 determines which of the images used to generate the wide FOV panoramic image contains the object detected at block 1915. For each of the images determined to contain the object, the annotation circuit 1465 may determine a position (e.g., an angular position) at which the detected object is located in the image based on a position of the object in the wide FOV panoramic image and, in some cases, knowledge of the overlap between the FOVs of the imaging systems 1410, 1415, 1420, and 1425 (e.g., knowledge of the overlap between the FOVs of the images received from the imaging systems 1410, 1415, 1420, and 1425).

At block 1925, the annotation circuit 1465 annotates each image from the imaging systems 1410, 1415, 1420, and 1425 that is determined to contain the object. Each image may be annotated to include an indication of the object in the image. For example, the annotation circuit 1465 may determine that an object detected by the detection circuit 1460 in the wide FOV panoramic image is also in the FOV of the imaging systems 1410 and 1415 and accordingly annotate the images provided at block 1905 by the imaging systems 1410 and 1415. For example, for a given object of interest detected in the wide FOV panoramic image, the annotation circuit 1465 may add a bounding box around the object, a label (e.g., a name or an identifier of the object), and/or other annotation to one or more of the narrower FOV panoramic images determined to contain the object. The annotated panoramic images may be provided for display, storage, and/or further processing. In some cases, the annotated panoramic images may be RTSP encoded and these RTSP steams provided for display, storage, and/or further processing. It is noted that, depending on a position of an object in the wide FOV panoramic image, not all of the images from the imaging systems 1410, 1415, 1420, and 1425 contain the object in some cases, and the annotation circuit 1465 may leave unannotated these images determined not to contain the object. These unannotated panoramic images may be provided along with the annotated panoramic images for display, storage, and/or further processing. In an aspect, an annotation on the panoramic image and the RTSP stream (of which the panoramic image is a part) may be, or may be referred to as, an overlay on/to the panoramic image and the RTSP stream, respectively. In some cases, alternatively or in addition, an annotation may be provided during later processing (e.g., after block 1925).

Blocks 1915, 1920, and 1925 may be performed for each object detected in the wide FOV panoramic image. In an embodiment, the process 1900 is performed in real time to annotate, based on detected objects, streams of video data (e.g., sequence of panoramic images) provided by the imaging systems 1410, 1415, 1420, and 1425. For example, with reference to FIG. 16, the combiner circuit 1645 combines four selected streams into a single stream and the detection circuit 1650 performs a detection process on the single stream.

In an embodiment, for situational awareness systems that support situational awareness using images associated with different wavebands, the process 1900 may be performed to generate wide FOV panoramic images of each waveband. The detection circuit 1460 is trained with imagery for desired wavebands to perform object detection at each desired waveband. In some aspects, object detection and/or image annotation performed on images of a certain waveband (e.g., visible-light images) may be mapped to images of another waveband (e.g., infrared images). In such aspects, objection detection and/or image annotation might not be separately performed on the other waveband's images, thus conserving system resources. In some cases, images of different wavebands (e.g., visible-light and infrared images) may be fused. In such cases, the detection circuit 1460 may be appropriately trained to perform object detection in fused images.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method comprising:
   receiving a respective image from each of a plurality of imaging systems;
   generating a single-first panoramic image based on the images received from the plurality of imaging systems;
   detecting an object in the single panoramic image, wherein the detecting comprises performing an object detection process on the single panoramic image without, prior to the performing the object detection process on the single panoramic image, performing a separate object detection process on each image received from the plurality of imaging systems and used to generate the single panoramic image;
   determining, for each image received from the plurality of imaging systems and used to generate the single panoramic image, whether the image contains the object detected in the single panoramic image; and
   annotating each image received from the plurality of imaging systems and determined to contain the object to include an indication associated with the object in the image.

2. The method of claim 1, further comprising determining, for each image received from the plurality of imaging systems and determined to contain the object, a location of the object in the image based at least on a location of the object in the single panoramic image and overlap associated with the images received from the plurality of imaging systems, wherein the detecting is based at least on convolutional neural networks, and wherein the overlap associated with the images is based on an overlap between field of views of the plurality of imaging systems.

3. The method of claim 1, further comprising:
   receiving a respective second image from each of a second plurality of imaging systems;
   generating a second panoramic image based on the second images received from the second plurality of imaging systems;
   detecting a second object in the second panoramic image;
   determining, for each second image received from the second plurality of imaging systems and used to generate the second panoramic image, whether the second image contains the second object detected in the second panoramic image; and
   annotating each second image received from the second plurality of imaging systems and determined to contain the second object to include an indication associated with the second object in the second image,
   wherein:
      at least one of the images from the plurality of imaging systems is a panoramic image having a field of view narrower than the single panoramic image;
      the single panoramic image is an infrared panoramic image; and
      the second panoramic image is a visible-light panoramic image.

4. The method of claim 3, further comprising:
   receiving a respective stream of video data from each of the plurality of imaging systems, wherein the respective image is received as a part of the respective stream of video data; and
   receiving a respective stream of video data from each of the second plurality of imaging systems, wherein the respective second image is received as a part of the respective stream of video data, and wherein each stream of video data is a real-time streaming protocol (RTSP) stream.

5. The method of claim 1, wherein the single panoramic image provides a 360 degree field of view, and wherein the method further comprises for each imaging system of the plurality of imaging systems:
   capturing, by the imaging system, a respective plurality of images, wherein each image of the respective plurality of images is associated with a respective portion of the 360 degree field of view; and
   generating, by the imaging system, the image based on the respective plurality of images.

6. The method of claim 1, wherein the determining and the annotating are performed after the generating and the detecting, and wherein the image from one of the plurality of imaging systems has a portion that overlaps with the image from another of the plurality of imaging systems.

7. The method of claim 1, further comprising:
   receiving a respective second image from each of a second plurality of imaging systems; and
   determining, for each second image received from the second plurality of imaging systems, whether the second image contains the object detected in the single panoramic image based on the detecting and the determining, for each image received from the plurality of imaging systems, whether the image contains the object.

8. The method of claim 1, further comprising:
   receiving, by a display device, each annotated image as part of a respective stream of video data; and
   displaying, by the display device, each annotated image.

9. A system comprising:
   a plurality of imaging systems, wherein each of the plurality of imaging systems is configured to capture a respective image; and
   a processing circuit comprising:
      a combiner circuit configured to:
         receive the images from the plurality of imaging systems; and
         generate a single panoramic image based on the images received from the plurality of imaging systems;
      a detection circuit configured to detect an object in the single panoramic image by performing an object detection process on the single panoramic image without, prior to the performing the object detection process on the single panoramic image, performing a separate object detection process on each image received from the plurality of imaging systems and used to generate the single panoramic image;
      an annotation circuit configured to:
         determine, for each image received from the plurality of imaging systems and used by the combiner circuit to generate the single panoramic image, whether the image contains the object detected in the single panoramic image;
         determine, for each image received from the plurality of imaging systems and determined to contain the object, a location of the object in the image based at least on a location of the object in the single panoramic image; and annotate each image received from the plurality of imaging systems and determined by the annotation circuit to contain the object to include an indication associated with the object in the image, wherein a location of the indication in the annotated image is based on a location of the object in the image.

10. The system of claim 9, wherein the annotation circuit is configured to determine, for each image received from the plurality of imaging systems and determined to contain the object, the location of the object in the image further based on overlap associated with the images received from the plurality of imaging systems, wherein the combiner circuit is configured to detect the object based on convolutional neural networks, and wherein, for each image received from the plurality of imaging systems and determined to contain the object, the indication associated with the object comprises a bounding box positioned around the object in the image.

11. The system of claim 9, further comprising a second plurality of imaging systems, wherein each of the second plurality of imaging systems is configured to capture a respective second image;

wherein the combiner circuit is further configured to:
receive the second images from the second plurality of imaging systems; and
generate a second panoramic image based on the second images received from the second plurality of imaging systems;

wherein the detection circuit is further configured to detect a second object in the second panoramic image;

wherein the annotation circuit is further configured to:
determine, for each second image received from the second plurality of imaging systems and used by the combiner circuit to generate the second panoramic image, whether the second image contains the second object detected in the second panoramic image; and
annotate each second image received from the second plurality of imaging systems and determined by the annotation circuit to contain the second object to include an indication associated with the second object in the second image.

12. The system of claim 11, wherein:
the plurality of imaging systems comprises a plurality of four thermal infrared imaging systems;
the second plurality of imaging systems comprises a plurality of four visible-light imaging systems;
the single panoramic image is an infrared panoramic image;
the second panoramic image is a visible-light panoramic image; and
the system further comprises a plurality of multiplexer circuits, wherein each of the plurality of multiplexer circuits is configured to selectively provide, to the combiner circuit, the image from a respective one of the four thermal infrared imaging systems or a respective one of the four visible-light imaging systems.

13. The system of claim 12, wherein:
each of the infrared panoramic image and the visible-light panoramic image provides a 360 degree field of view;
each of the four thermal infrared imaging systems comprises:
a plurality of thermal infrared imaging devices, wherein each of the plurality of thermal infrared imaging devices is configured to capture a respective thermal image associated with a portion of the 360 degree field of view; and
a stitching circuit configured to generate the image of the thermal infrared imaging system based on the thermal images captured by the plurality of thermal infrared imaging devices; and
each of the four visible-light imaging systems comprises:
a plurality of visible-light imaging devices, wherein each of the plurality of visible-light imaging devices is configured to capture a respective visible-light image associated with a portion of the 360 degree field of view; and
a stitching circuit configured to generate the image of the visible-light imaging system based on the visible-light images captured by the plurality of visible-light imaging devices.

14. The system of claim 9, wherein at least one of the images from the plurality of imaging systems is a panoramic image having a field of view narrower than the single panoramic image, wherein the combiner circuit is further configured to receive the respective image from each of the plurality of imaging systems as a part of a respective stream of video data from each of the plurality of imaging systems, and wherein each stream of video data is a real-time streaming protocol (RTSP) stream.

15. The system of claim 9, wherein the plurality of imaging systems are collectively configured to capture a 360 degree field of view, wherein each of the plurality of imaging systems is configured to capture a portion of the 360 degree field of view, and wherein the image from one of the plurality of imaging systems has a portion that overlaps with the image from another of the plurality of imaging systems.

16. The system of claim 9, further comprising a display device configured to:
receive each annotated image as part of a respective stream of video data; and
display each annotated image.

17. The system of claim 9, further comprising a plurality of radar systems configured to provide a 360 degree composite field of view and capture radar data in the 360 degree composite field of view.

18. A vehicle comprising the system of claim 9, wherein each of the plurality of imaging systems is attached to the vehicle.

19. The vehicle of claim 18, wherein the plurality of imaging systems are configured to collectively provide a 360 degree field of view around the vehicle.

20. The system of claim 9, wherein, for each image received from the plurality of imaging systems and determined to contain the object, the location of the object in the image is further based on overlap associated with the images received from the plurality of imaging systems.

* * * * *

UNITED STATES PATENT AND TRADEMARK OFFICE
CERTIFICATE OF CORRECTION

| | | |
|---|---|---|
| PATENT NO. | : 12,363,440 B2 | Page 1 of 1 |
| APPLICATION NO. | : 17/514516 | |
| DATED | : July 15, 2025 | |
| INVENTOR(S) | : Bruce Poirier | |

It is certified that error appears in the above-identified patent and that said Letters Patent is hereby corrected as shown below:

In the Claims

Claim 1, Column 27, Line 16, change "generating a single-first panoramic" to --generating a single panoramic--.

Signed and Sealed this
Sixteenth Day of September, 2025

Coke Morgan Stewart
*Acting Director of the United States Patent and Trademark Office*